(12) United States Patent
Price et al.

(10) Patent No.: US 10,984,586 B2
(45) Date of Patent: Apr. 20, 2021

(54) SPATIAL MAPPING FUSION FROM DIVERSE SENSING SOURCES

(71) Applicant: MICROSOFT TECHNOLOGY LICENSING, LLC, Redmond, WA (US)

(72) Inventors: Raymond Kirk Price, Redmond, WA (US); Yuri Pekelny, Seattle, WA (US); Michael Bleyer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/047,265

(22) Filed: Jul. 27, 2018

(65) Prior Publication Data

US 2020/0035020 A1    Jan. 30, 2020

(51) Int. Cl.
| | |
|---|---|
| *G06T 17/05* | (2011.01) |
| *G06T 7/11* | (2017.01) |
| *G06K 9/00* | (2006.01) |
| *G06T 5/50* | (2006.01) |
| *G06T 7/00* | (2017.01) |

(Continued)

(52) U.S. Cl.
CPC .......... *G06T 17/05* (2013.01); *G06K 9/00664* (2013.01); *G06T 5/50* (2013.01); *G06T 7/0002* (2013.01); *G06T 7/11* (2017.01); *G06T 15/04* (2013.01); *G06T 19/006* (2013.01); *G06T 17/20* (2013.01); *G06T 2207/10028* (2013.01); *G06T 2207/20081* (2013.01); *G06T 2207/20221* (2013.01); *G06T 2207/30168* (2013.01)

(58) Field of Classification Search
None
See application file for complete search history.

(56) References Cited

U.S. PATENT DOCUMENTS

| | | |
|---|---|---|
| 9,342,929 B2 | 5/2016 | Kamuda et al. |
| 9,646,410 B2 | 5/2017 | Collet Romea et al. |

(Continued)

FOREIGN PATENT DOCUMENTS

EP       2800055 A1    11/2014

OTHER PUBLICATIONS

Damala, et al., "Adaptive Augmented Reality for Cultural Heritage: Artsense Project", in Proceeding of Euro-Mediterranean Conference, Oct. 29, 2012, pp. 746-755.

(Continued)

*Primary Examiner* — Peter Hoang
(74) *Attorney, Agent, or Firm* — Workman Nydegger

(57) ABSTRACT

In some instances, spatial mapping data from one spatial mapping is used to augment the spatial mapping data in another spatial mapping. First and second spatial mapping data is accessed, where both the first and second spatial mapping data overlap in that they both, at least partially, describe the same portion of an environment three-dimensionally. A determination is made as to whether the second spatial mapping data is to augment the first spatial mapping data. If so, then the second spatial mapping data is used to augment the first spatial mapping data. Otherwise, the second spatial mapping data is not used to augment the first spatial mapping data. These determinations may be based, at least in part, on determined quality levels of the first and second spatial mapping data.

18 Claims, 20 Drawing Sheets

(51) Int. Cl.
  *G06T 15/04* (2011.01)
  *G06T 19/00* (2011.01)
  *G06T 17/20* (2006.01)

(56) References Cited

U.S. PATENT DOCUMENTS

| | | |
|---|---|---|
| 10,732,797 B1 | 8/2020 | Perez et al. |
| 2012/0115513 A1 | 5/2012 | Han |
| 2014/0204077 A1* | 7/2014 | Kamuda ............... A63F 13/335 345/419 |
| 2015/0016714 A1 | 1/2015 | Chui |
| 2016/0148433 A1 | 5/2016 | Petrovskaya et al. |
| 2017/0004649 A1* | 1/2017 | Collet Romea ....... G06T 15/205 |
| 2017/0084082 A1 | 3/2017 | Mctaggart et al. |
| 2017/0109940 A1 | 4/2017 | Guo et al. |
| 2017/0205875 A1* | 7/2017 | Kaehler ............. G06K 9/00926 |
| 2018/0089905 A1* | 3/2018 | Solenthaler ............ G06T 11/60 |
| 2018/0124371 A1 | 5/2018 | Kamal et al. |
| 2020/0035024 A1 | 1/2020 | Price et al. |

OTHER PUBLICATIONS

"International Search Report and Written Opinion Issued in PCT Application No. PCT/US2019/039360", dated Sep. 20, 2019, 12 Pages.

"International Search Report and Written Opinion Issued in PCT Application No. PCT/US2019/040437", dated Sep. 11, 2019, 15 Pages.

Tan, et al., "Cloud-Based Depth Sensing Quality Feedback for Interactive 3D Reconstruction", in Proceeding of International Conference on Acoustics, Speech and Signal Processing, Mar. 25, 2012, pp. 5421-5424.

"Non Final Office Action Issued in U.S. Appl. No. 16/047,269", dated Oct. 30, 2019, 15 Pages.

"International Search Report and Written Opinion Issued in PCT Application No. PCT/US2019/039360", dated Oct. 29, 2019, 12 Pages.

"Final Office Action Issued in U.S. Appl. No. 16/047,269", dated Apr. 22, 2020, 24 Pages.

"Non Final Office Action Issued in U.S. Appl. No. 16/047,269", dated Aug. 19, 2020, 25 Pages.

\* cited by examiner

SPATIAL MAPPING FUSION FROM DIVERSE SENSING SOURCES

BACKGROUND

Mixed-reality systems, including virtual-reality (VR) and augmented-reality (AR) systems, have received significant attention because of their ability to create truly unique experiences for their users. For reference, conventional VR systems create a completely immersive experience by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting holograms that are placed in or that interact with the real world. As used herein, a "hologram" is a virtual image/object that is formed by projecting light patterns to form a desired design or a 3D representation of a computer-generated image. Examples of holograms include, but are not limited to, virtual cars, planes, text, graphics, videos, books, magazines, laser guns, dragons, zombies, and others. It will be appreciated that a mixed-reality system is able to project and render any kind of hologram in any shape, dimension, size, or configuration.

As used herein, VR and AR systems are described and referenced interchangeably. Unless stated otherwise, the descriptions herein apply equally to all types of mixed-reality systems, which (as detailed above) include AR systems, VR systems, and/or any other similar system capable of displaying holograms. One object or purpose of a mixed-reality environment/scene is to provide a user with a virtualized experience where, although the displayed content may be a fantasy, the interactions with the displayed content are designed to be as realistic as possible. For instance, a user may understand that a zombie is not real. Regardless, the mixed-reality system can enable the user to interact with the zombie in a highly realistic manner. This experience (i.e. providing a highly realistic interactive experience) is achieved by displaying 3D content (i.e. holograms) using a mixed-reality system. To do so, some systems scan the environment using any number of different 3D sensing technologies in order to generate an understanding of the environment in which the holograms will be placed. Ideally, the potentially multiple 3D scans from different systems would improve the rendering of the 3D space, but that is not always the case, as described further below.

Some of the disclosed mixed-reality systems use one or more on-body devices (e.g., the HMD, a handheld device, etc.). The HMD provides a display that enables a user to view overlapping and/or integrated visual information (e.g., holograms) in whatever environment the user is in, be it a VR environment, an AR environment, or any other type of environment. Continued advances in hardware capabilities and rendering technologies have greatly improved how mixed-reality systems render holograms, or 3D content, to the user. Notwithstanding those advances, the process of immersing a user into a mixed-reality environment creates many challenges and difficulties, particularly when the mixed-reality environment relies on different three-dimensional (3D) data sets that each have different quality levels.

For instance, there are many difficulties associated with developing a mixed-reality environment (also referred to herein as a "scene"), particularly when the mixed-reality environment is dependent on 3D information obtained from multiple different sources and when the data from those different sources varies in quality and integrity. Current methodologies are in place to scan an environment (e.g., including scans of any objects) in order to reconstruct geometric surfaces included within that environment. In some cases, this scanning process includes obtaining multiple images of the environment and then generating a spatial mapping of the environment. The spatial mapping is then consulted and used for presenting virtual content to a mixed-reality system user. Sometimes, spatial mappings are shared between disparate mixed-reality systems, which enables virtual content to be broadly used and accessed. In this regard, some spatial mappings (which describe 3D objects, spaces, and/or other elements) may be scanned by different sources, thus resulting in potential disparities between the configurations and content included within these different spatial mappings. Disparities include, but are not limited to, differences in rendering information included in point clouds, meshes, or textured/colored meshes. Unfortunately, however, use of different spatial mappings results in differing levels of quality and sometimes having to rely on a quality that is lower or higher than desired. Sometimes, the different spatial mappings are also incompatible with disparate systems. Additionally, there is a need to better manage the input that is provided to a spatial mapping, particularly when received from different scanning hardware sources. As such, there is a need to be able to modify the manner in which spatial mappings are generated, and in particular to be able to modify the quality of these spatial mappings, especially if those mappings are to be shared with or accessed by other mixed-reality systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, wearable devices, and methods for merging/fusing surface reconstruction data to generate an overall spatial mapping of an environment and/or object and, even more particularly, to systems that systematically modify the quality of the overall spatial mapping in order to achieve a desired quality level and, in some instances, to ensure compatibility. As used herein, the term "environment" should be interpreted broadly to refer to any kind of location, region, area, or even an individual object. For instance, an environment may be a room in a house, the inside of a car, the outside of the car, or even simply a ball (i.e. an object). In this regard, when reference is made to an "environment," that reference may refer to expansive areas (like rooms) or to individual objects (like a ball).

In some embodiments, an environment's stored spatial mapping is accessed. This spatial mapping includes first spatial mapping data that describes the environment three-dimensionally, and it can also include coloring and/or texturing information. Additionally, second spatial mapping data is also accessed. This second data describes at least a particular range of the environment three-dimensionally. Both the first and second spatial mapping data include an overlapping portion (i.e. a first portion and a second portion, respectively) that concurrently/simultaneously describes the same particular range. A determination is made as to whether the second portion is to augment the first portion in the stored spatial mapping. If so, then the first portion is augmented with the second portion. If not, however, then the second portion is refrained or prevented from augmenting the first portion.

In some embodiments, an environment's spatial mapping is accessed, where the spatial mapping includes first spatial mapping data that describes the environment three-dimensionally. A quality level (i.e. a "first" quality level) for a portion of the first spatial mapping data (e.g., a portion corresponding to a particular area in the environment) is determined to be below a quality threshold. In response to this determination, a number of different operations may be performed. In a first scenario, a scanning operation is performed on the particular area to generate second spatial mapping data for that particular area or for that object. In an alternative scenario, third-party content describing the particular area is accessed in order to generate the second spatial mapping data. Consequently, both the first and the second spatial mapping data describe the same particular area. Thereafter, the second spatial mapping data is delayed from being incorporated into the spatial mapping until such time as the second spatial mapping data's quality level (i.e. a second quality level) reaches the desired quality threshold. To do so, the second spatial mapping data is continuously or periodically modified via the scanning operation (or by obtaining other data from remote source) until that quality threshold is satisfied by the second quality level. Once the quality threshold is satisfied, the second spatial mapping data is incorporated into the spatial mapping in order to bring the quality level to the desired level.

In some embodiments, multiple different portions of spatial mapping data are merged/fused together to form an overall spatial mapping. This may be accomplished, for example, by receiving first and second spatial mapping data, both of which describe (three-dimensionally) the same environment and perhaps even the same area or region within that environment. Thereafter, both the first and second spatial mapping data are analyzed to determine their quality levels (e.g., a first quality level and a second quality level, respectively, which may also include determining compatibility). Portions of the first spatial mapping data are then compared against corresponding portions of the second spatial mapping data, where the comparison includes comparing the corresponding quality levels. Then, the embodiments incorporate, into the overall spatial mapping, spatial mapping data having a relatively higher quality level as between each of the portions of the first and second spatial mapping data. By so doing, at least some of the portions of the first spatial mapping data are merged or otherwise fused together (in some instances, they can also be stitched together) in the overall spatial mapping with at least some of the portions of the second spatial mapping data, and which are determined in some instances to be cross-device compatible and/or within a relatively consistent quality threshold. In this regard, the union of multiple spatial mappings may be performed using a process referred as volumetric fusion, which is described in more detail later.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 9 also shows that the different spatial mappings can be merged together even if their quality levels are different.

FIG. 12 shows some non-limiting example areas where conflicts can occur.

DETAILED DESCRIPTION

Figure 1:
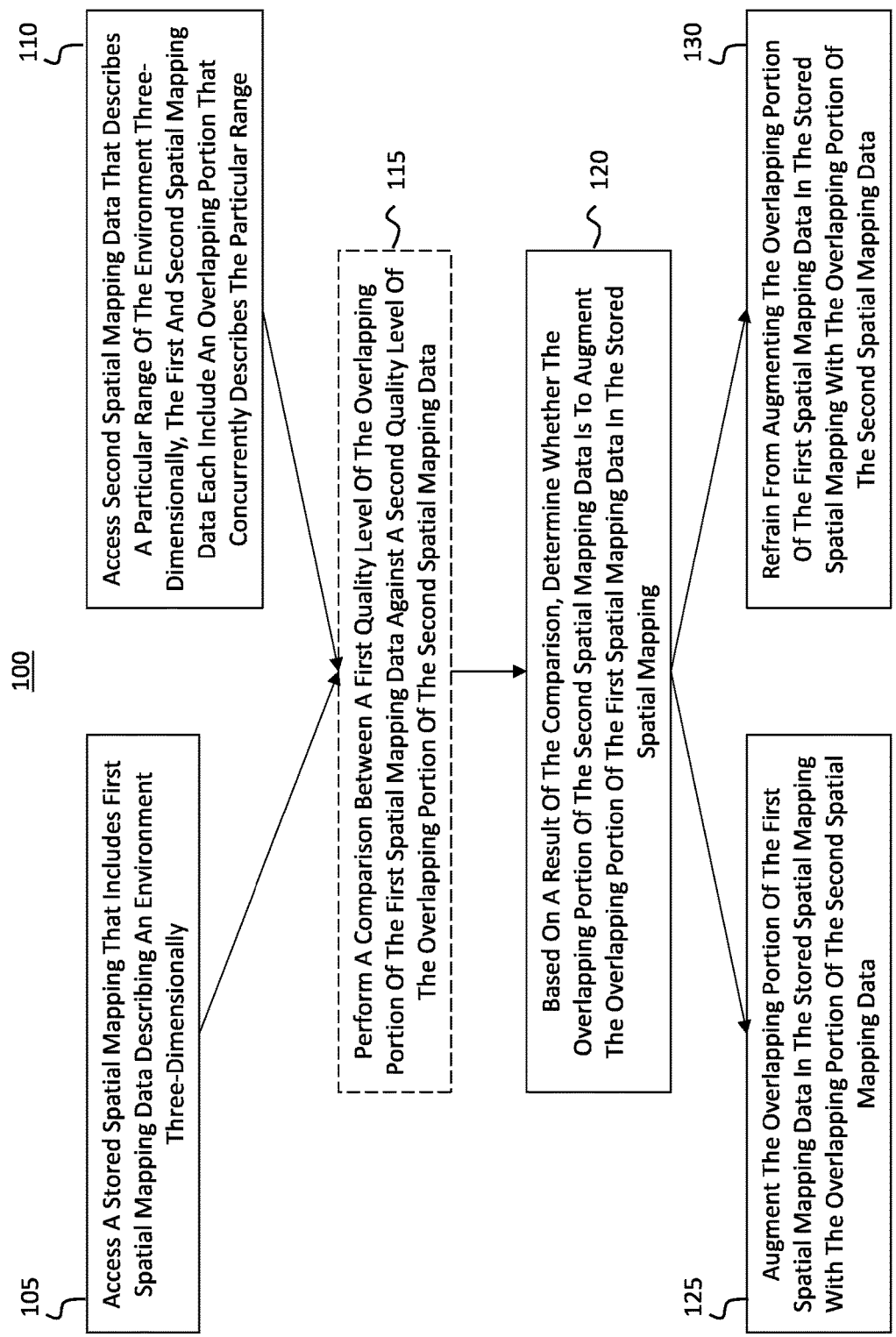
FIG. 1 illustrates a flowchart of an example method for augmenting spatial mapping data with additional spatial mapping data in order to achieve a desired level of quality for a resulting spatial mapping.

The disclosed embodiments are directed to systems, wearable devices, and methods that compare and contrast the different quality levels of different spatial mappings and that then selectively incorporate (based on the comparison) selected portions of spatial mapping data into an overall spatial mapping in order to achieve a desired quality level and to improve a user's mixed-reality experience. As used herein, "quality" may refer to the level of detail and/or accuracy that a spatial mapping describes an environment. Relatively more detail corresponds to relatively higher quality levels while relatively less detail corresponds to relatively lower quality levels.

In some embodiments, a determination is made as to whether an overlapping portion of second spatial mapping data is to augment an overlapping portion of first spatial mapping data, where the first and second spatial mapping data both concurrently describe, three-dimensionally, the same particular range of an environment. Consequently, the second spatial mapping data either augments or does not augment the first spatial mapping data depending on a result of the above-recited determination.

In some embodiments, a first quality level for first spatial mapping data (that corresponds to a particular area in an environment) is determined to fall below a pre-defined quality threshold. In response, either (1) a scanning operation is performed in order to generate second spatial mapping data for the particular area or (2) third-party content that also describes the particular area is accessed in order to generate the second spatial mapping data. In either case, both the first and second spatial mapping data are designed to concurrently describe the same particular area. Thereafter, the second spatial mapping data is delayed from being incorporated into the spatial mapping until such time as the second spatial mapping data's quality level satisfies the quality threshold. This is achieved by continuously or periodically modifying the second spatial mapping data via a scanning operation to obtain additional 3D data to improve the second spatial mapping data. Once the desired quality threshold is satisfied by the second spatial mapping data's quality level, then the second spatial mapping data is incorporated into the spatial mapping to either offset, augment, supplement, or perhaps even replace the first spatial mapping data.

In some embodiments, first and second spatial mapping data is received, where they both describe, three-dimensionally, the same area within an environment. The first and second spatial mapping data are then analyzed to determine their respective quality levels. Then, for specific portions of the spatial mapping, the corresponding quality levels as between the first and second spatial mappings are compared to determine which one is higher in quality. The different portions of data having relatively higher quality levels are then incorporated into an overall spatial mapping. Consequently, at least some portions of the first spatial mapping data are merged together in the overall spatial mapping with at least some of the portions of the second spatial mapping data.

By practicing the disclosed principles, significant advantages and benefits can be realized both in terms of improvements to the technology and improvements to how computing systems operate. For instance, with the increasing popularity of mixed-reality systems, there is a need to also improve the quality levels of the virtual objects (i.e. "holograms") that are projected for a user to view and interact with. An increase in quality of these holograms directly improves the user's experience. It is noted that these holograms are often built using three dimensional information generated from a spatial mapping of an environment. Furthermore, it is noted that spatial mappings can be transferred from one mixed-reality system to another. Unfortunately, it is difficult to guarantee the level of quality or integrity of the data that is included in these spatial mappings, especially when a spatial mapping is transferred or received from another mixed-reality system with 3D sensing/mapping capabilities. As such, the disclosed embodiments beneficially provide techniques and methodologies for systematically building and improving spatial mappings, including the quality of these spatial mappings. Such operations directly improve the user's experience because the realism and relatability of the resulting holograms (which are built using the data included in the spatial mapping) is improved.

Example Methods for Comparing Quality and Merging Data Together

Attention will now be directed to FIG. 1 which refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. It will be appreciated that any of the methods described herein may be performed by a specially configured computer system, such as the computer system shown later in FIG. 17.

FIG. 1 shows a flowchart of an example method 100 for determining whether to augment the data included within a particular spatial mapping. Initially, a stored spatial mapping of an environment is accessed (act 105). As used herein, a "spatial mapping" refers to a digital representation or construct of an environment. A spatial mapping may be generated from or may include, but is not limited to, any number of depth maps, 3D dot/point clouds, and/or a 3D mesh. Further details on a spatial mapping will be provided later in connection with FIGS. 2A through 6.

In this case, the spatial mapping includes first spatial mapping data that describes the environment in a three dimensional (3D) manner. For instance, the spatial mapping may include depth information, color information, and/or texture information about the environment as a whole, including any objects located within the environment and any holograms that may be projected into the environment (thereby becoming a "mixed-reality" environment). For reference, "color" may be used to signify varying degrees of depth or texture for a given object, thus representing the object three-dimensionally. Some embodiments use a monochromatic coloring scheme while others use a chromatic coloring scheme to signify depth.

In addition to accessing the first spatial mapping data, second spatial mapping data is also accessed (act 110). This second spatial mapping data describes at least a particular range or area of the environment three-dimensionally. Because both the first and second spatial mapping data describe the environment, it means that both the first and second spatial mapping data each include an "overlapping" portion that concurrently describes at least the same particular range of the environment.

Optionally (as shown by the dashed box for act 115), a comparison between certain quality levels can be performed (act 115). Specifically, a first quality level of the overlapping portion of the first spatial mapping data is compared against a second quality level of the overlapping portion of the second spatial mapping data.

Based on a result the comparison (if that comparison is performed), a determination can be made as to whether the overlapping portion of the second spatial mapping data is to augment the overlapping portion of the first spatial mapping data in the stored spatial mapping of the environment (act 120). The process of augmenting is more fully described later, but in general, it means to supplement (i.e. complement/add to) and/or replace one portion of data with another portion of data.

If it is determined that the overlapping portion of the second spatial mapping data is to augment the overlapping portion of the first spatial mapping data, then the overlapping portion of the first spatial mapping data in the stored spatial mapping is augmented with the overlapping portion of the second spatial mapping data (act 125).

Alternatively, if it is determined that the overlapping portion of the second spatial mapping data is not to augment the overlapping portion of the first spatial mapping data, then the overlapping portion of the second spatial mapping data is refrained from augmenting the overlapping portion of the first spatial mapping data (act 130). Accordingly, the disclosed embodiments are able to progressively modify the quality level of a spatial mapping by augmenting the spatial mapping's data to eventually achieve a desired quality level.

Spatial Mappings, Holograms, and 3D Meshes

As an initial matter, it is noted that during design of a mixed-reality environment/scene, a hologram can be "placed" at a certain area or region within the mixed-reality environment. Use of the term "placed" means that the hologram has been assigned to operate within the selected area. As an example, consider a classroom setting. Here, a professor can design a mixed-reality environment for his/her students by placing different holograms at different (or even overlapping) regions within the classroom. For instance, a hologram can be placed on the top of the professor's desk, holograms can be placed in the air immediately in front or above each student, and a large theatre-like hologram can be projected near the front of the classroom. Such positioning enables the students to view and potentially interact with these holograms. In this regard, holograms are assigned locations within a particular environment in which to operate and to perform their designed holographic functions. It will also be appreciated that any number of holograms may be assigned to a given environment. For instance, in the classroom example, that particular classroom may be used by 2, 3, 4, 5, 6, or any number of different professors, each with his/her own classroom agenda and specific holograms. As such, there may be an innumerable number of holograms that are actually located within the same environment or region (e.g., the same classroom).

As described earlier, a "spatial mapping" refers to a digital representation or construct of an environment. In some scenarios, a spatial mapping may include, but is not limited to, any number of depth maps, 3D dot/point clouds, and/or a 3D mesh comprised of polygons (e.g., triangles). A triangular 3D mesh is comprised of many different triangles, where the collective combination of these triangles accurately represents the various features of all or some geometric surfaces in the environment. A 3D mesh may be generated for only a single object or for an entire environment or region. When the 3D mesh is of an entire region, then it can be thought of as a compilation of holograms or holographic information that describes "objects" as well as the different geometric surfaces of those objects (e.g., the walls, doors, tables, windows, virtual objects, etc.). Spatial mappings can also include information about object mapping as well as information obtained from scanning an individual object, group of objects, or even an entire environment. In this regard, a spatial mapping can be generated for a very small object or it can be highly scalable/expandable and represent a very large region.

Other information may be included in the spatial mapping as well. For instance, some of the information that describes the environment and that is included in the spatial mapping may include planar information for any geometric planes in the environment. Additionally, or alternatively, some of the information may include volumetric information for any cubic areas in the environment. Additionally, some of the information in the spatial mapping may include information about holograms that are to be projected for viewing by a user. For instance, the spatial mapping may (at least initially) include information about all of the holograms that are placed/located within a particular region, even if all of those holograms will not be projected for viewing by a user (e.g., some might be filtered from being projected). Accordingly, the spatial mapping may include a vast array of information.

It is also noted that some portions of the spatial mapping may have different quality levels than other portions. For instance, consider a scenario where a spatial mapping describes a living room. For one area of the living room, the spatial mapping may include highly detailed data describing every feature and part of that area, while for a different area, the spatial mapping may include only rudimentary data that just minimally describes the area (e.g., a skeletal representation). In this regard, the spatial mapping may have quality discrepancies in how it describes (three-dimensionally) a mixed-reality environment, which may include any real-world objects and/or virtual objects/holograms.

Figure 2B:
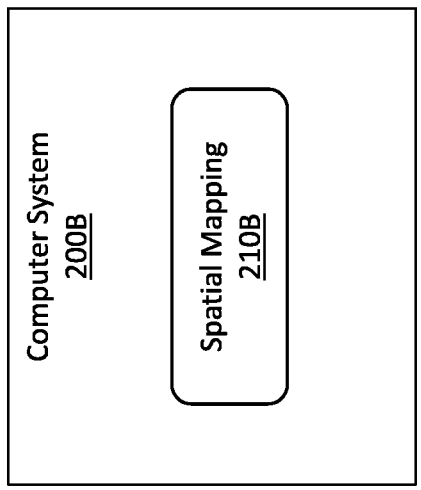
FIGS. 2A and 2B illustrate how a spatial mapping can be accessed from a remote location, or, alternatively (or additionally) from a local location.
Figure 2A:
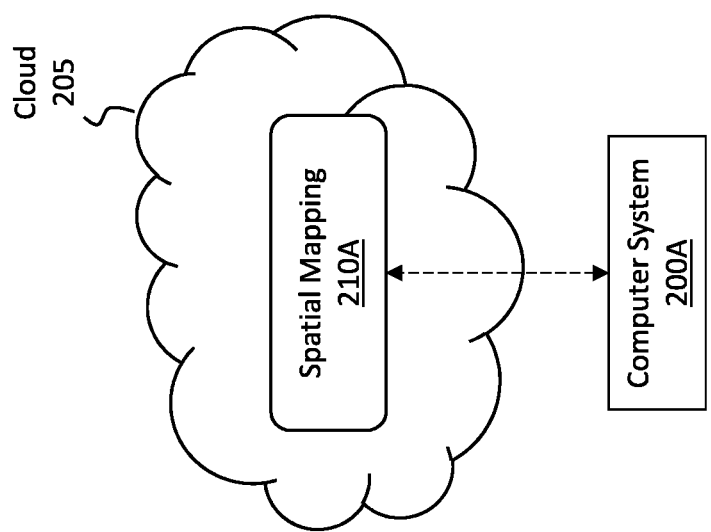

It will also be appreciated that the spatial mapping can be stored in a cloud environment or on a local device. Combinations of the above are also available. FIG. 2A shows a computer system 200A that is able to communicate with a cloud environment 205 to access a spatial mapping 210A. In this situation, the spatial mapping 210A was previously generated by the computer system 200A (or by an entirely separate system), and the computer system 200A is simply obtaining access to that spatial mapping 210A, which is shared over a network connection between itself and the cloud environment 205. In this manner, spatial mappings can be shared and distributed to any number of other mixed-reality computer systems.

In other scenarios, a computer system (e.g., a 3D sensing system) can be used to generate a spatial mapping and then store that spatial mapping locally or remotely (e.g., as will be described by the depth engine in FIG. 17). For instance, FIG. 2B shows an example computer system 200B capable of locally generating and storing a spatial mapping 210B. Of course, it will be appreciated that the computer system 200B, after generating the spatial mapping 210B, is able to upload or otherwise store the spatial mapping 210B in a cloud environment. It will be appreciated that the scanning process may utilize color texturing to describe (three-dimensionally) the objects in the environment. The scanning may be performed by imaging hardware incorporated into the HMD, such as one or more time of flight cameras, stereoscopic cameras, depth cameras, etc.

Figure 3:
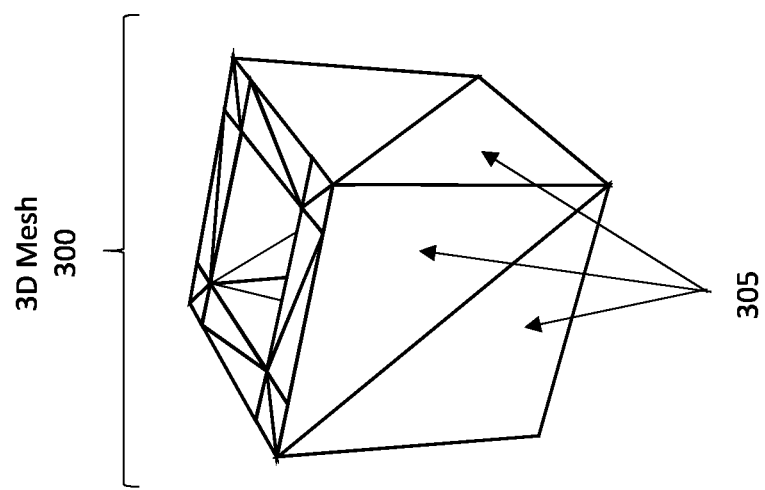
FIG. 3 illustrates a 3D mesh and, in particular, how a triangular 3D mesh can be used to describe geometric surfaces of an object (both a real-world object and a virtual object/hologram).

FIG. 3 shows one example implementation of a spatial mapping (e.g., the spatial mapping 210A or 210B from FIGS. 2A and 2B, respectively). In FIG. 3, the spatial mapping is in the form of a 3D mesh 300. Here, 3D mesh 300 is comprised of any number of triangles 305 (or other polygons), which are organized in a manner so as to describe the contours and boundaries of an object. While FIG. 3 shows a 3D mesh describing only a single cubic object, it will be appreciated that a 3D mesh may also be used to describe an entire environment and any objects (virtual or real) located within that environment.

Figure 4:
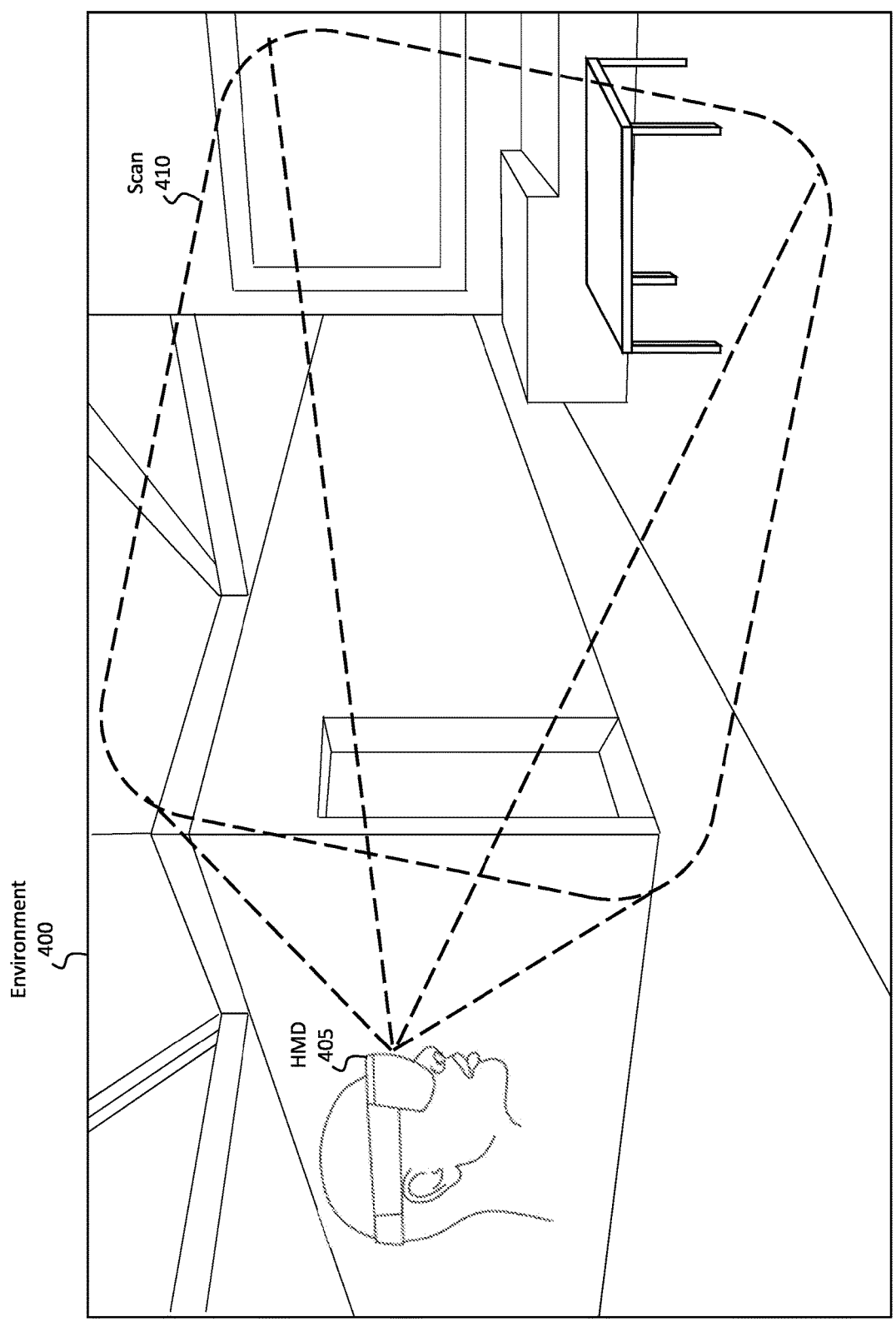
FIG. 4 illustrates a scanning operation in which an environment is scanned using one or more hardware scanners (e.g., time of flight cameras, stereoscopic cameras, depth cameras, etc.) in order to generate a spatial mapping for that environment, and where the spatial mapping can include color information, color texturing information, or other types of texturing information to signify depth.

FIG. 4 shows a situation in which a HMD is generating a spatial mapping through use of its cameras (e.g., time of flight cameras, stereoscopic cameras, depth cameras, etc.). Stated differently, a spatial mapping can be created through use of a 3D sensing system that generates 3D data via a scanning operation. Therefore, when reference is made to a "scanning operation," it will be appreciated that such an operation can be performed by one, two, three, or any number of 3D sensing systems, some of which have different depth modulation abilities (as described in more detail later).

FIG. 4 shows an environment 400 that includes various different objects (e.g., the table, the door, the picture frame, etc.). Here, HMD 405 is being used to map environment 400 three-dimensionally via the scan 410. The result of this 3D mapping process is a spatial mapping, such as spatial mapping 210A or 210B from FIGS. 2A and 2B, respectively, comprising a virtual representation of the environment. It will be appreciated that the resulting spatial mapping of environment 400 may be uploaded to a cloud environment for persistent storage, for use by the scanning HMD 405 and/or another HMD that is rendering the virtual representation of the environment.

Figure 5:
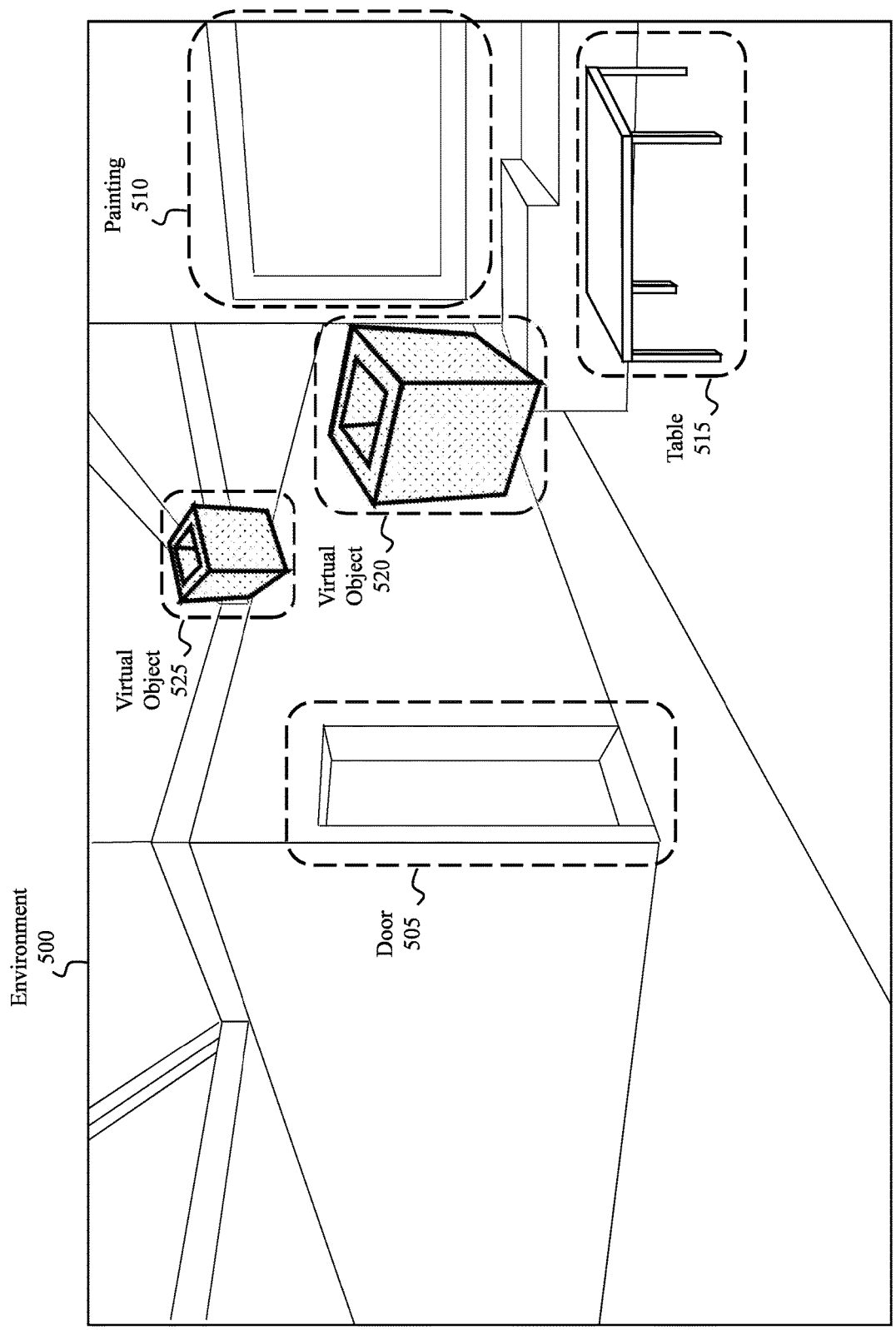
FIG. 5 illustrates how objects can be segmented from one another and how those objects' types can be identified.

After generating the spatial mapping, objects associated with that environment can be identified. For example, FIG. 5 shows an environment 500 that is an example representation of environment 400 from FIG. 4. Objects included within the resulting spatial mapping have been segmented. For instance, FIG. 5 shows a door object 505, a painting object 510, a table object 515, a first virtual object 520, and a second virtual object 525. The door object 505, painting object 510, and table object 515 correspond to real-world items while the first and second virtual objects 520 and 525 correspond to virtual objects/holograms.

As shown, the disclosed embodiments are able to identify a type/classification for each of the objects, and the resulting spatial mapping may include object labeling, where the object labeling/segmentation information includes classifiers to identify objects within the environment (e.g., a "door" classifier, a "table" classifier, etc.). This may be achieved via machine learning or via any other segmentation technique. Accordingly, the spatial mapping of the environment may include segmentation information for real-world objects located within the environment and/or for virtual objects that may be projected into a mixed-reality environment.

Figure 6:
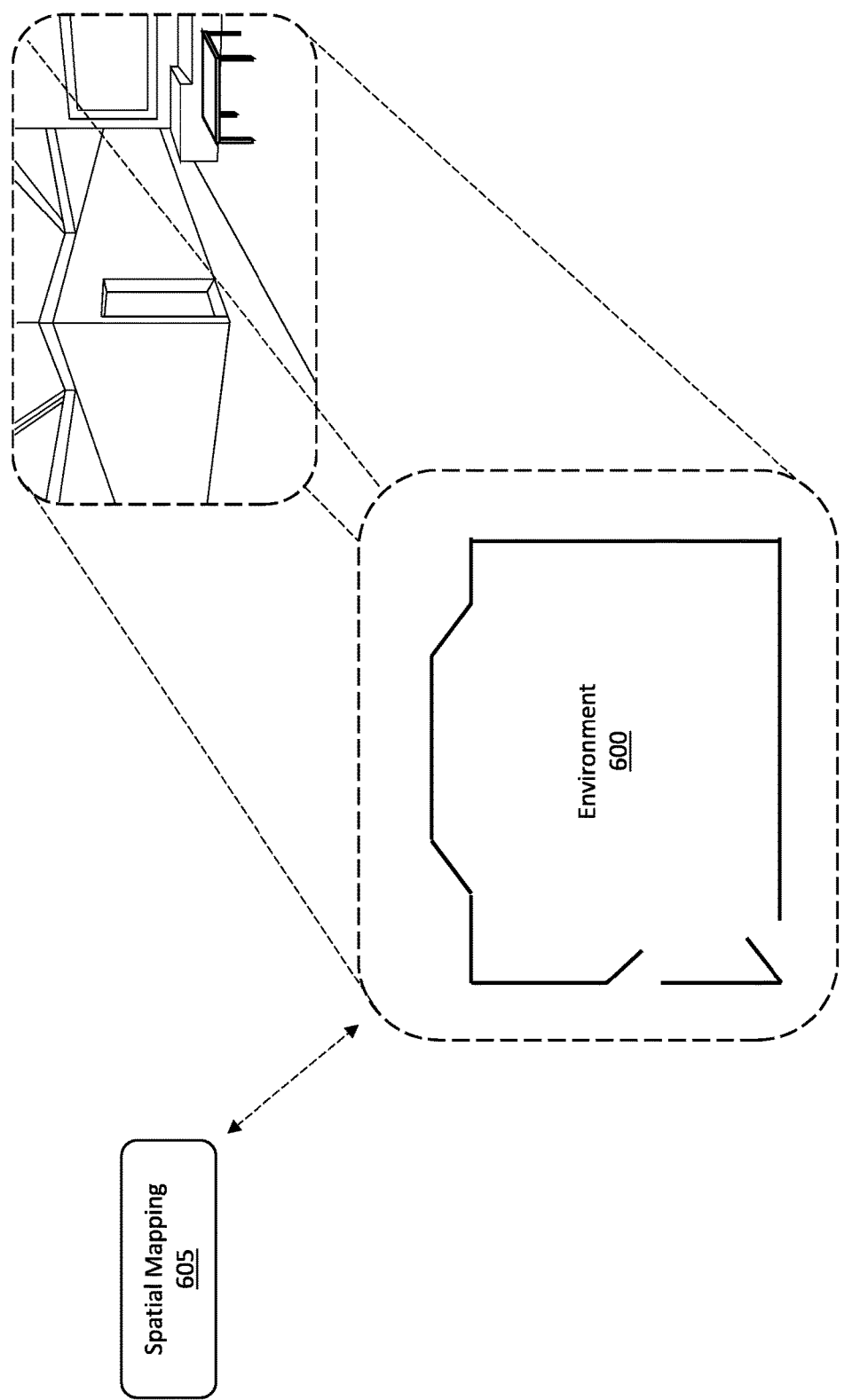
FIG. 6 provides another scenario in which an environment's spatial mapping is made available for use.

FIG. 6 shows a high-level view of an environment 600 that is similar to the environment 500 of FIG. 5. FIG. 6 also shows a spatial mapping 605 which comprises a 3D digital/virtual representation of environment 600. In this regard, the disclosed embodiments are able to use a data acquisition system (e.g., a HMD with cameras) to collect information about an environment and to generate a spatial mapping for that environment. Alternatively, the embodiments are able to access an already-built spatial mapping of an environment when performing the disclosed operations.

Differing Quality Levels of Spatial Mapping Data

Figure 7A:
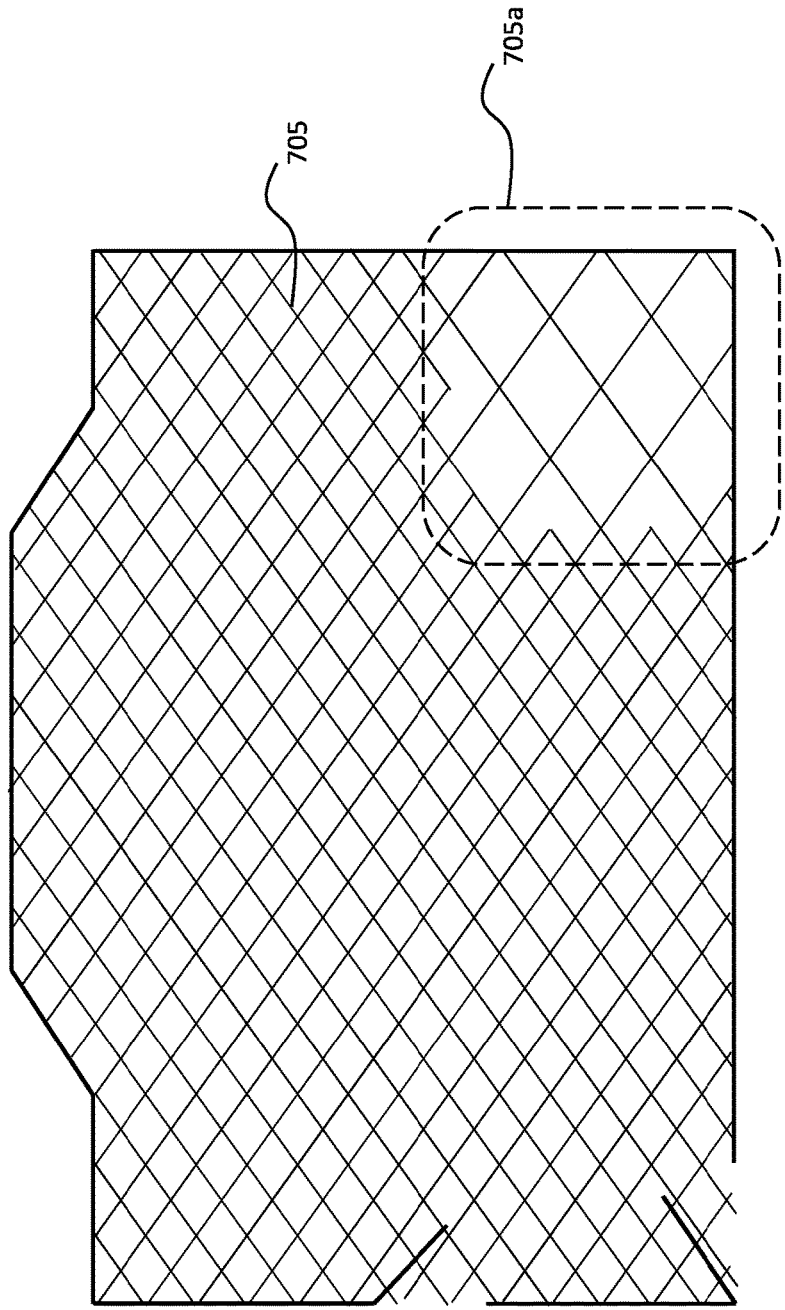
FIGS. 7A, 7B, and 7C illustrate different spatial mappings of an environment, where portions of those different spatial mappings overlap with one another so as to describe the same area and where those different spatial mappings are of differing qualities.
Figure 7B:
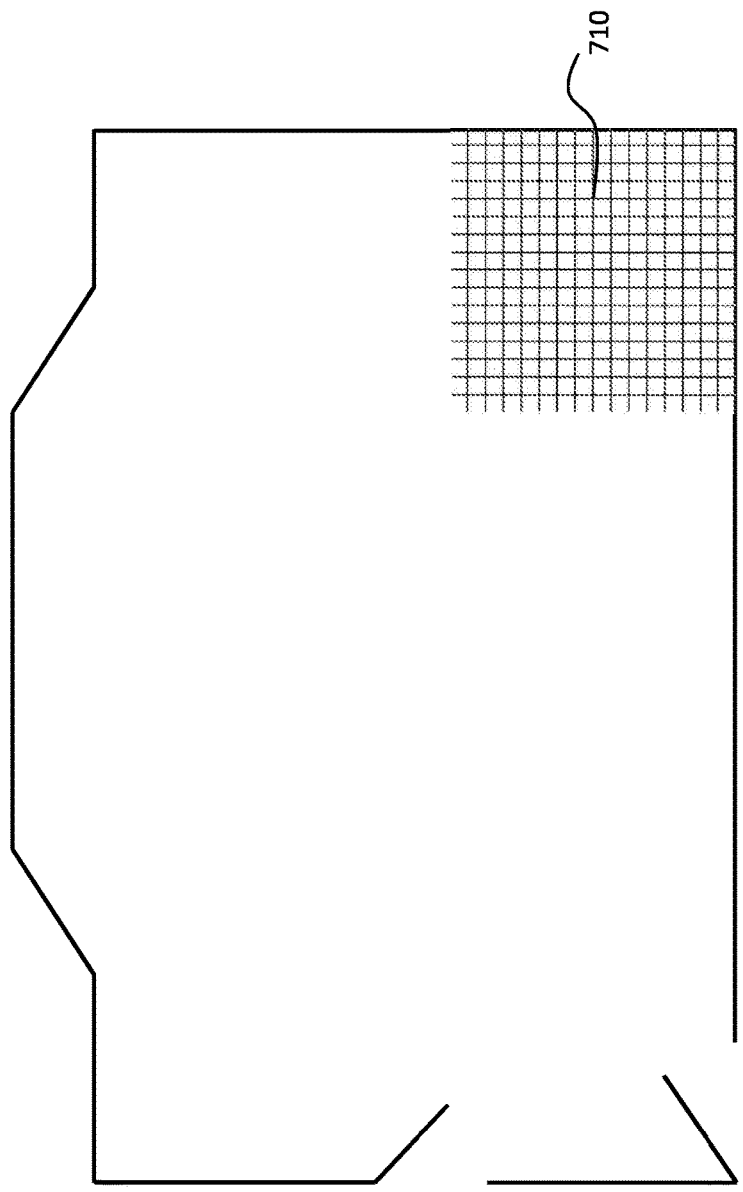
Figure 7C:
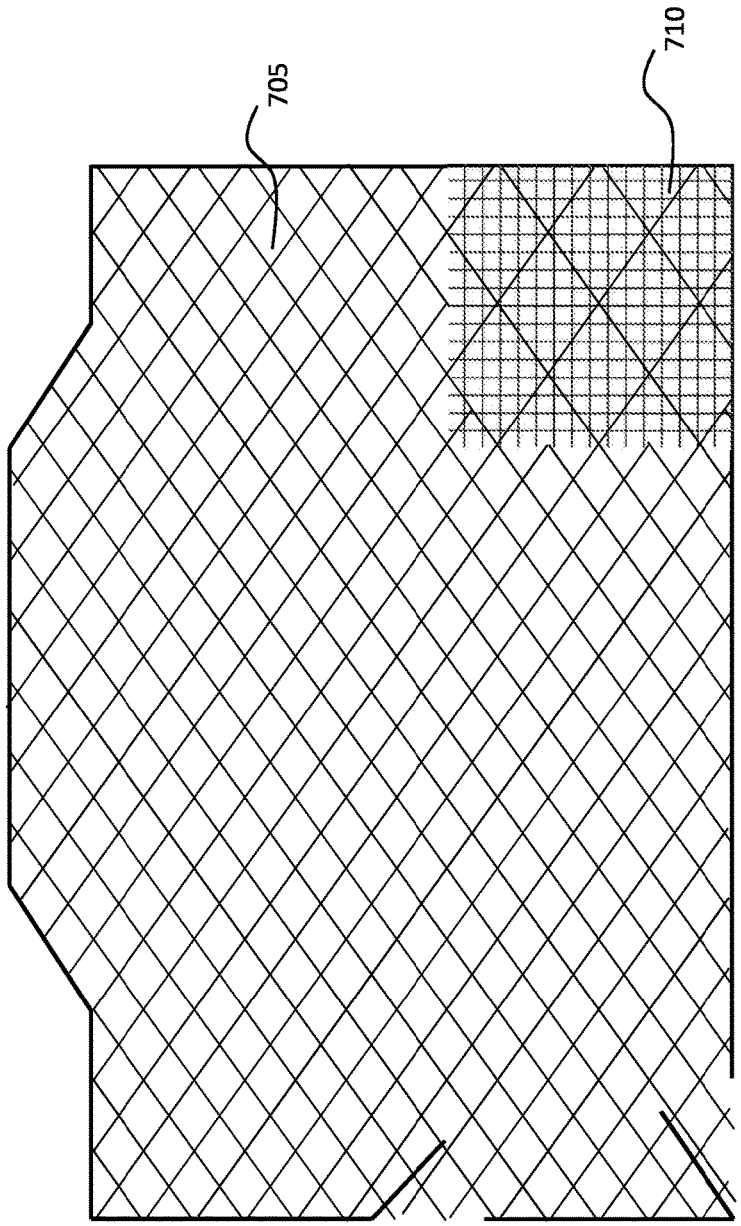

Attention will now be directed to FIGS. 7A, 7B, and 7C which show how multiple different spatial mappings may be merged or fused together. As described earlier, merging/fusing multiple spatial mappings may be performed via a volumetric fusion process. In this process, an input spatial mapping is converted into a volumetric Signed Distance Function (SDF) representation, where the signed distance values are computed using weighted averages based on the input quality as measured, and then a 3D mesh or a point cloud is extracted from the SDF data using an algorithm. FIG. 7A shows an example environment 700A, which is an example representation of environment 600 from FIG. 6. Here, the cross hatchings symbolically represent a spatial mapping 705 that describes the environment 700A in a three dimensional (3D) manner. Additionally, the configuration of the cross hatchings (i.e. the spacing, size, and orientation) symbolically represent the quality of the spatial mapping 705. In this and the examples to follow, cross hatchings that are tighter-knit correspond to a higher quality representation of an environment (i.e. they include a more detailed three-dimensional description of the environment) as compared to cross hatchings that are loosely-knit, which correspond to lower quality descriptions. As shown by the area 705a, spatial mapping 705 is not uniform across its entirety, meaning that some portions of spatial mapping 705 are more detailed (and thus higher quality) than other portions of spatial mapping 705. To further clarify, the spatial mapping portion describing area 705a has less detail (and thus is of a lower quality) than the other portions of spatial mapping 705. One reason as to why a scan may include less detail is because of timing constraints. Longer scans can produce more detailed spatial mappings while shorter scans typically produce less details spatial mappings. Additionally, levels of detail may be influenced by longer scanned depth distances (i.e. the distance between the scanning camera(s) and the object being scanned) and even to reduced sensor qualities.

FIG. 7B shows environment 700B, which is an example representation of environment 700A from FIG. 7A. In this scenario, there is a much smaller spatial mapping 710 describing only a particular portion/area of environment 700B (here, the described portion actually corresponds to area 705a in FIG. 7A i.e. the lower right-hand corner). In some instances, spatial mapping 710 can be considered as an "incomplete" spatial mapping in that it does not describe the entirety of environment 700B. Alternatively, an incomplete spatial mapping may be a mapping that does not include a threshold amount of descriptive data describing an environment. In this regard, some spatial mappings may have high quality but may be incomplete. Also, pieces of input, when properly managed, can serve to improve the quality of the spatial mappings by adding additional data points. As evidenced by its tighter-knit cross hatchings, however, spatial mapping 710 is higher in quality than spatial mapping 705 as a whole, and it is significantly more detailed than the portion of spatial mapping 705 describing area 705a. This difference in quality could be (but is not required to be) because spatial mapping 710 is designed to be smaller and is focused only on a specific portion or area of environment 700B (i.e. the lower righthand corner) whereas spatial mapping 705 is designed to cover a much broader/expansive area.

FIG. 7C shows an environment 700C, which is an example representation of environment 700B from FIG. 7B. Here, spatial mapping 710 has been overlaid on top of spatial mapping 705. This overlay is provided to more fully illustrate the differences in quality between the two spatial mappings, and particularly for the overlaid area. It will be appreciated that in some instances, spatial mapping 705 is generated by a first 3D sensing device while spatial mapping 710 is generated by a second 3D sensing device. Alternatively, the two spatial mappings may be created by the same 3D sensing device, but at different time periods and with different 3D sensing criteria. For instance, the criteria for generating spatial mapping 705 may have been to get as broad of 3D coverage as possible while the criteria for generating spatial mapping 710 may have been to get detailed and highly specific 3D coverage for only a particular area in the environment. As such, different criteria may be used when generating the different spatial mappings, where the criteria may influence the level of detail or quality for the resulting spatial mapping. Voids, or other missing portions of the spatial map, will also impact the level of detail/quality of a spatial mapping. In this regard, an incomplete spatial mapping (i.e. one that includes voids or missing portions) will likely be of a lower quality than a spatial mapping that fully represents (i.e. no or a lesser number of voids or missing points) the mixed-reality environment.

From this example, it is apparent that significant advantages may be realized by merging the highly detailed spatial mapping 710 with the less detailed spatial mapping 705, and most especially for the area 705a. Whereas area 705a was only minimally described by spatial mapping 705, area 705a is intricately described by spatial mapping 710. Notably, however, spatial mapping 710 is limited only to a small area. As such, combining the expansive descriptions provided by spatial mapping 705 with the intricate descriptions of spatial mapping 710 will provide (overall) a much better spatial mapping of environment 700C. Accordingly, the disclosed embodiments are able to achieve these benefits by selectively merging portions of one (or more) spatial mappings with portions of one (or more) other spatial mappings, as further described below.

In some cases, spatial mapping 705 may be stored locally and/or remotely on one device, and spatial mapping 710 may be stored locally and/or remotely on another device. As described earlier, however, spatial mappings can be transferred between different computing devices. Therefore, there may be situations in which it is desirable to incorporate the higher (or possibly lower) quality data from one spatial mapping into another spatial mapping to thereby modify the overall quality of a spatial mapping. Stated differently, it may be desirous to merge the data from one spatial mapping into a different spatial mapping in order to achieve a desired quality level. It will be appreciated there are a plethora of different reasons as to why one device might request spatial mapping data from another device as opposed to generating a new spatial mapping itself (e.g., battery constraints, scanning hardware limitations, etc.).

Figure 8:
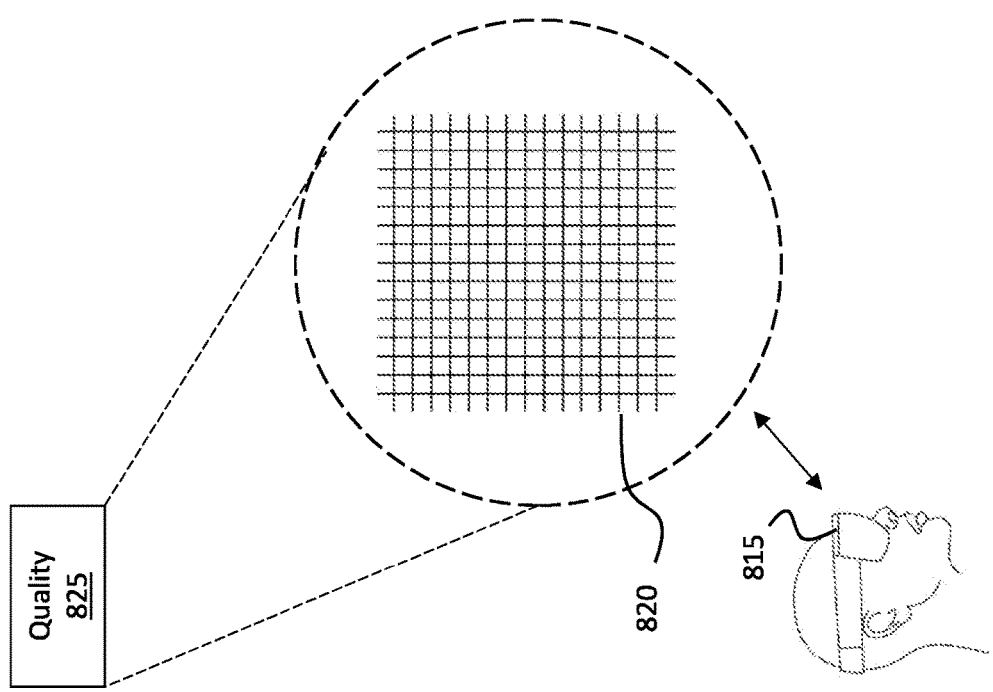
FIG. 8 illustrates how the qualities of different spatial mappings can be compared and contrasted with one another in order to determine whether the data from one spatial mapping is to be fused with the data from another spatial mapping.
Figure 8:
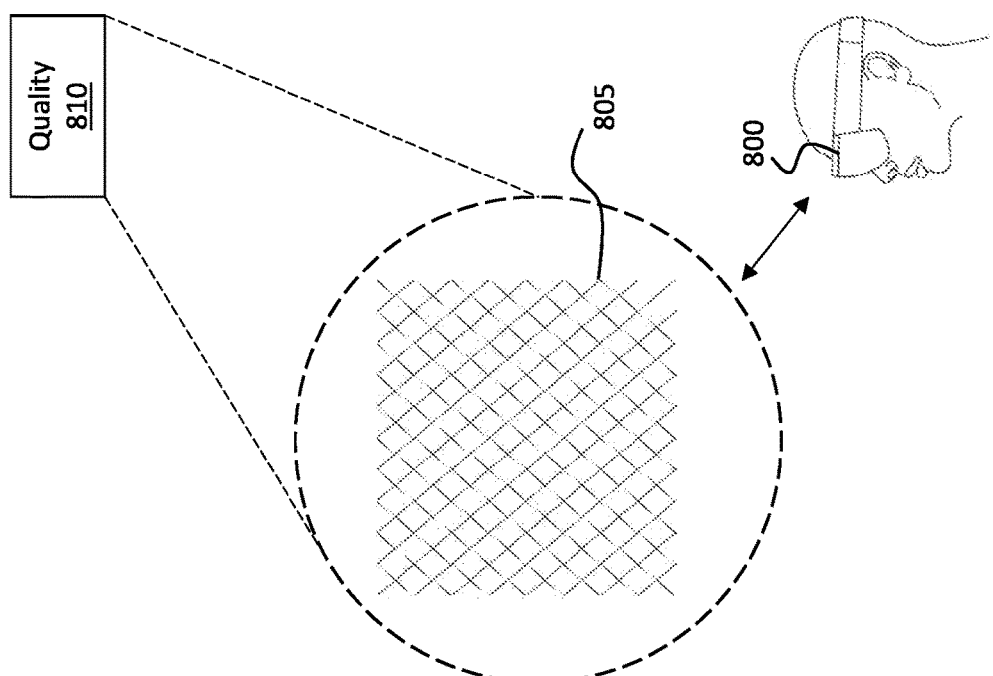

FIG. 8 shows a situation in which the quality levels of two different spatial mappings are being compared and contrasted with one another to determine whether a merge/fusion operation should be performed. Specifically, FIG. 8 shows a first HMD 800 that is associated with a first spatial mapping 805 having a first quality level 810. Additionally, FIG. 8 shows a second HMD 815 that is associated with a second spatial mapping 820 having a second quality level 825. In this scenario, the first quality level 810 is being compared against the second quality level 825 to determine which of the two has the higher or lower quality level.

As will be described in more detail to follow, it is often the case that higher quality data is being sought after, but in some instances, some embodiments purposely request or seek after lower quality data (e.g., a device with lower resolution abilities may request to use a lower quality/resolution spatial mapping as opposed to a higher quality/resolution spatial mapping, or if there are bandwidth constraints in transmitting the 3D data). Accordingly, FIG. 8 shows a scenario where different quality levels can be compared against one another. Such comparisons are particularly beneficial when determining whether to augment the data in one spatial mapping with the data from another spatial mapping, and particularly when both spatial mappings describe the same area in an environment (e.g., to continuously improve the environment's overall spatial mapping by including updated and improved spatial mapping data for particular areas of the environment).

Figure 9:
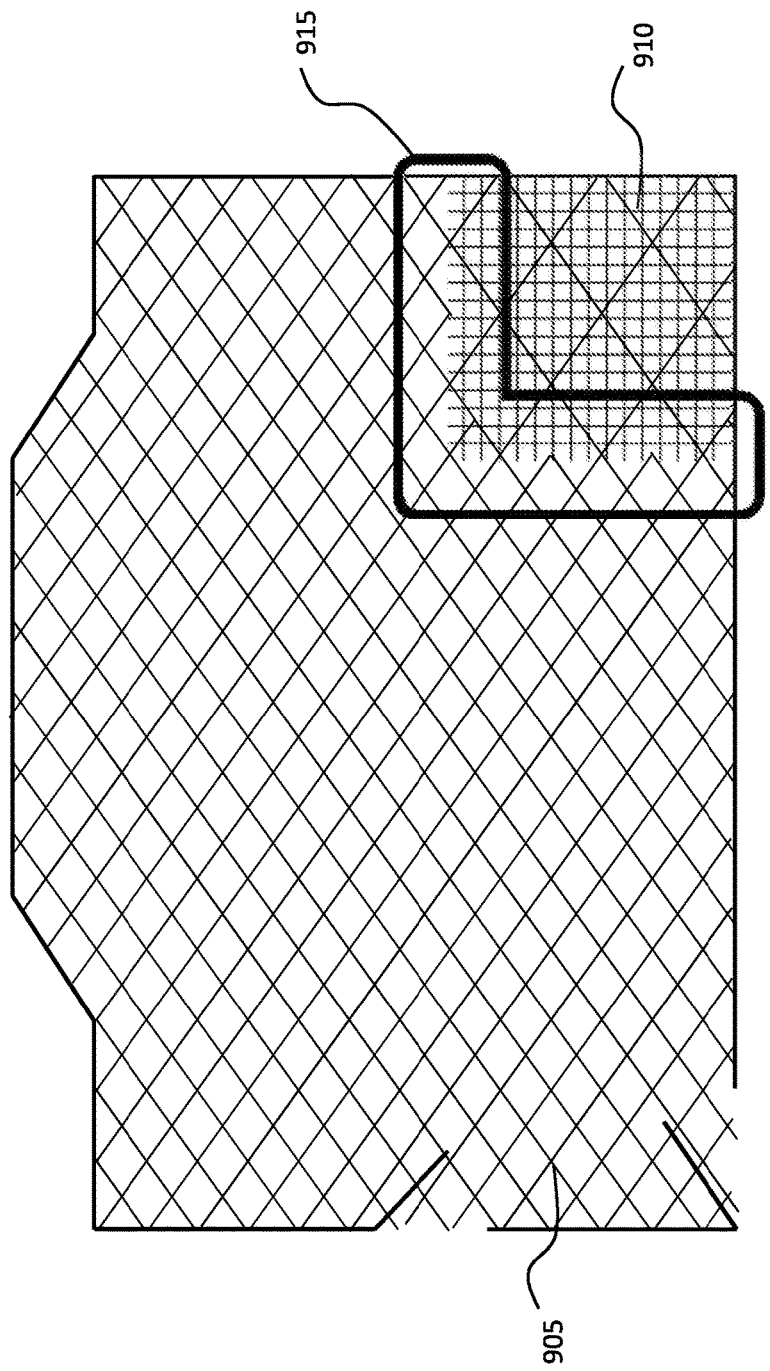
FIG. 9 illustrates how the spatial mapping data from two (or any number) different spatial mappings can be merged together to form an overall spatial mapping.

FIG. 9 shows an example environment 900, which is an example representation of any of the environments from FIGS. 7A-7C. Here, there is a first spatial mapping 905 (representative of spatial mapping 705 from FIG. 7C) of a first quality level and a second spatial mapping 910 (representative of spatial mapping 710 from FIG. 7C) of a second quality level. As shown by the merge 915, the first spatial mapping 905 has been merged together with the second spatial mapping 910. By so doing, the overall average quality of the spatial mapping describing environment 900 is improved because of the incorporation of the higher quality spatial mapping 910. From this, it will be appreciated that the data from any number of spatial mappings can be merged together in order to generate an overall spatial mapping of a particular environment. Furthermore, it will be appreciated that selected sub-portions of a spatial mapping can be discriminately merged into selected sub-portions of another spatial mapping, as opposed to replacing an entire spatial mapping.

Figure 10:
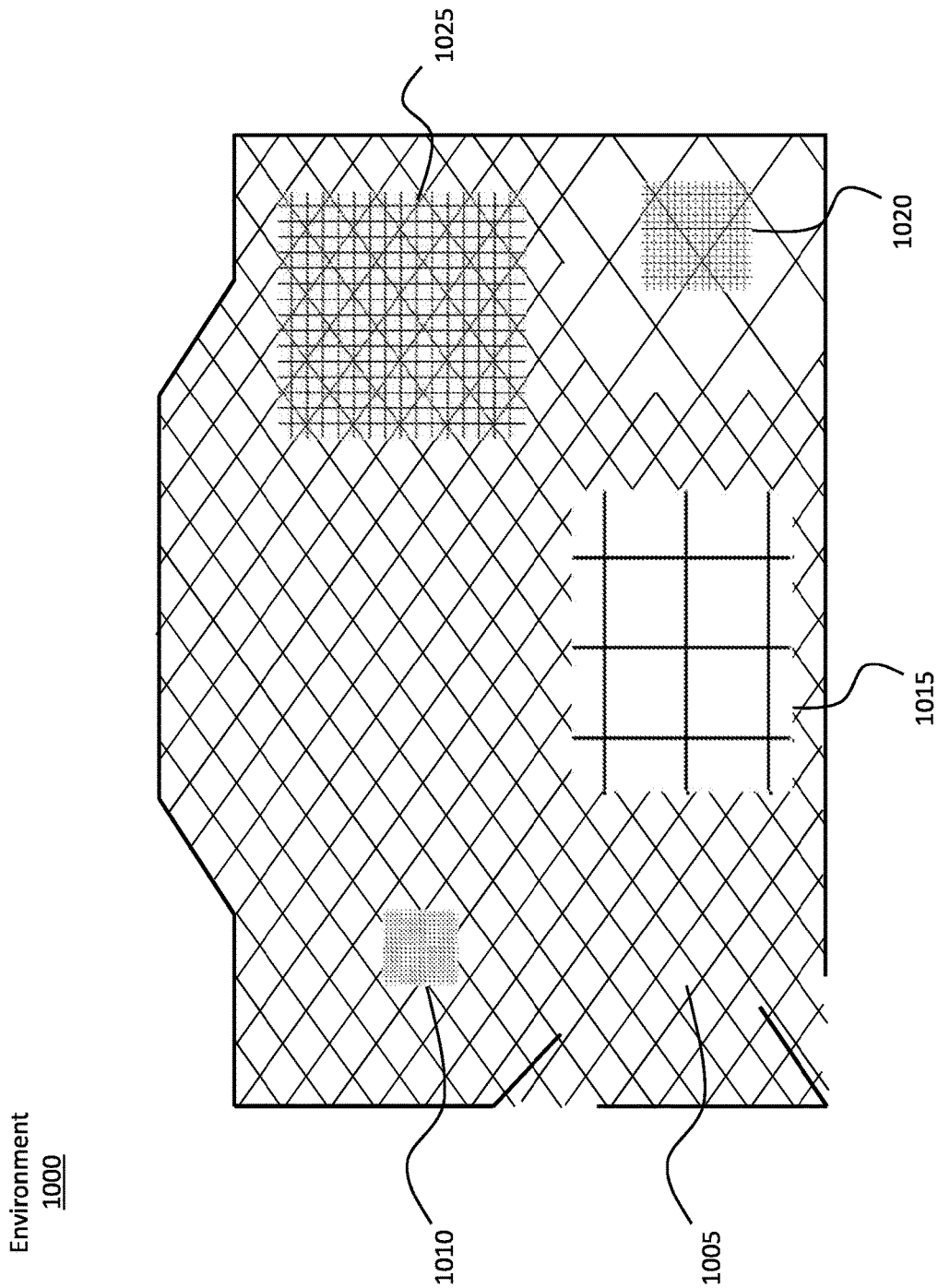
FIG. 10 illustrates another scenario where different spatial mappings are being fused together, even though they have different quality levels.

FIG. 10 shows an example environment 1000, which is also an example representation of any of the environments from any of the previous figures. Here, there is a first spatial mapping 1005, a second spatial mapping 1010, a third spatial mapping 1015, a fourth spatial mapping 1020, and a fifth spatial mapping 1025, all of these different spatial mappings have been merged together to thereby form an overall spatial mapping for the environment 1000. As shown by the differing tightness of the cross hatchings in each of the different spatial mappings, each spatial mapping is of a different quality level.

In this example, spatial mappings 1010, 1015, 1020, and 1025 are all "augmenting" spatial mapping 1005. As will described in more detail in connection with FIG. 11, the augmenting process may include "supplementing" data with additional data (i.e. adding to the existing data) or, alternatively, "replacing" data with other data. In FIG. 10, the data from spatial mappings 1010 and 1015 have replaced the corresponding data in spatial mapping 1005 (as shown by the fact that spatial mapping 1005 is not included in the background of these two spatial mappings). In contrast, the data from spatial mappings 1020 and 1025 has been selected to supplement (i.e. add to) the data included in spatial mapping 1005 (as shown by the fact that spatial mapping 1005 is present in the background of these two spatial mappings).

Notice that both spatial mappings 1010 and 1020 are very detailed (i.e. a higher quality), spatial mapping 1025 is moderately detailed (i.e. an average quality), and spatial mappings 1005 and 1015 are less detailed (i.e. a lower quality). In this regard, a single combined coherent spatial mapping may describe an environment in varying degrees of detail resulting in varying degrees of quality.

Some reasoning as to why it may be beneficial to combine spatial mappings of different quality levels is that in some cases, more or less quality is desired when a mixed-reality system is operating in a particular area of an environment. For instance, consider a scenario where a virtual Easter Egg hunt is to take place in a dining room environment. The purpose of a virtual Easter Egg hunt is to hide virtual eggs in obscure locations and to cause children to go find those virtual eggs. To achieve this objective in virtual space, it is highly beneficial to have a very detailed and thorough digital understanding of the immediate environment (e.g., to better hide the virtual eggs). Therefore, for this example scenario, it will be very advantageous to have a highly robust, detailed, and accurate spatial mapping of the dining room. Also, often the orientation and distance of the scanning hardware (i.e. during the 3D capture) can impact the quality of the capture. For instance, if the capture is performed at a far distance, the physical space between pixels and depth accuracy may be compromised. To compensate, some systems can average multiple measurements in order to improve the accuracy of the measured value/spatial mapping.

With reference to FIG. 10, the environment 1000 may be of an entire floor in a house, and the area described by spatial mapping 1010 may correspond to the dining room portion of environment 1000. In this case, spatial mapping 1010 has been merged with spatial mapping 1005 in order to provide the desired level of detail/quality to host the virtual Easter Egg hunt. In this regard, augmentation/merging operations may be performed in real-time and on an on-demand basis.

In contrast, consider a scenario where the environment includes a theatre room, and a host desires to have many different people join in watching a particular thematic type of hologram. Because of the relatively simple layout of a theatre room and because of the desire to include as many people as possible (where each person may have a different type of mixed-reality system with different rendering/resolution abilities), it may be advantageous to use a spatial mapping that is somewhat lower in quality. By using a lower quality spatial mapping, it means that the resulting resolution of the thematic type of hologram will be projectable on all of the guests' mixed-reality systems, even in light of the fact that those systems have different rendering capabilities. With reference to FIG. 10, spatial mapping 1015 (which may correspond to the theatre room) may be used in this example scenario. In this regard, the quality of a spatial mapping (or portion thereof) may be specifically selected or adjusted to guarantee a desired level of quality for a particular use-case scenario.

Accordingly, the disclosed embodiments are able to compare and contrast quality levels of the different spatial mappings. In cases where increased quality is desired, the embodiments are able to selectively choose, extract, create, or request specific portions of spatial mapping data from among any number of other spatial mappings (provided, of course, that those other spatial mappings describe the same area of interest) and cause those portions to augment their own spatial mapping data. In cases where decreased quality is desired, the embodiments are able to selectively identify and isolate specific portions of spatial mapping data from a current spatial mapping and replace those specific portions with data from a lower quality spatial mapping or simply delete those portions of data and not replace it with other data. In this regard, the embodiments are able to dynamically adjust (in any manner, either up or down) the quality of a spatial mapping in order to achieve a desired quality level.

Figure 11:
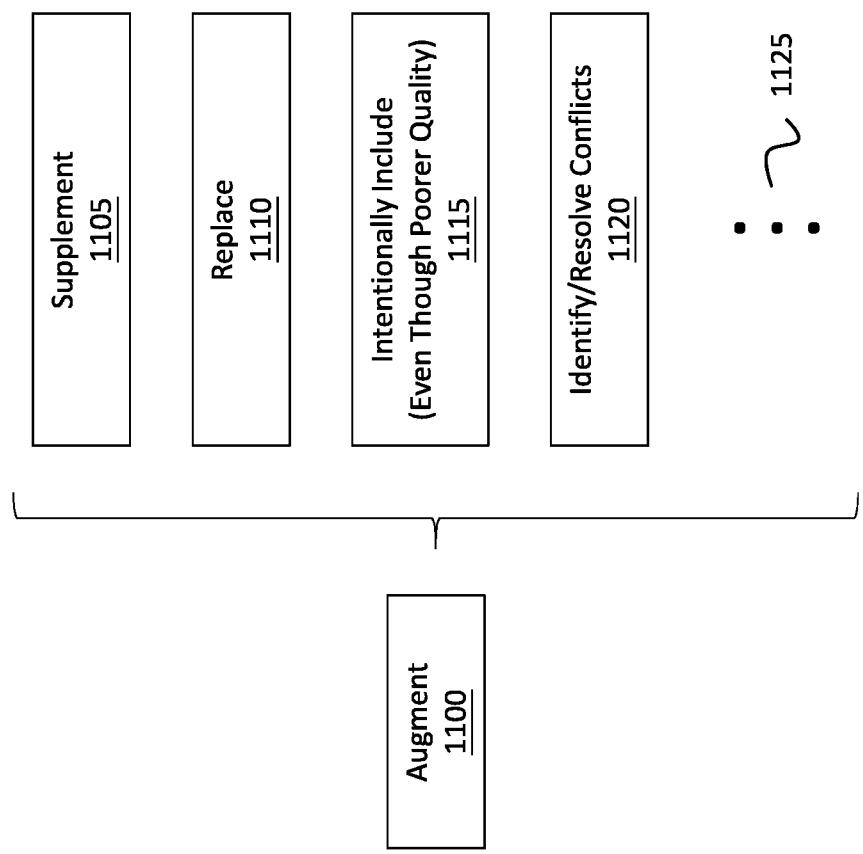
FIG. 11 illustrates some of the different augmentation techniques that can be used when merging/fusing data together from different spatial mappings.

FIG. 11 shows some of the processes that may be used to incorporate/augment the spatial mapping data from one spatial mapping into another spatial mapping. As used herein, the term "augment" refers to the operations of merging together the spatial mapping data from different spatial mapping. Furthermore, the augmentation process can be performed in a number of different ways.

FIG. 11 shows that the augment process 1100 may include, but is not limited to, a supplement process 1105, a replace process 1110, an intentionally include process 1115 (even though the resulting spatial mapping may be lower in quality), and an identify/resolve conflict process 1120. The ellipsis 1125 signifies that the augment process 1100 may include other types of processes as well. It will be appreciated that the spatial mapping data used during the augment process 1100 may be pulled, fetched, or otherwise accessed from the local mixed-reality system and/or from any number of remote systems, including cloud systems, servers, and other mixed-reality systems.

To clarify, the spatial mapping data may be obtained by performing an entirely new 3D scanning operation using the current mixed-reality system's 3D imaging sensors (e.g., time of flight cameras, stereoscopic cameras, depth cameras, etc.). Additionally, or alternatively, the spatial mapping data may be obtained from any number of other mixed-reality system's 3D imaging sensors and then transferring that spatial mapping. Additionally, or alternatively, the spatial mapping data may be obtained by accessing spatial mapping data that is already available and stored in a repository (e.g., either locally or remotely, such as in a cloud datastore).

The supplement process 1105 refers to a technique where the spatial mapping data from at least two (though it could be 3, 4, 5, 6, or more than 6) different spatial mappings is added together in a complementary manner and without the deletion of any spatial mapping data from any of those spatial mappings (perhaps resulting in duplicate information), such as is shown by spatial mappings 1005/1020 and 1005/1025 in FIG. 10. For instance, in the case where the spatial mapping includes depth maps and/or 3D point clouds, the data from the different depth maps and/or 3D point clouds is combined to thereby produce a more densely defined depth map and/or 3D point cloud. This combination of data results in a spatial mapping that includes a more detailed representation of the corresponding environment. In the case where the spatial mapping includes a 3D mesh or other type of 3D representation, a similar procedure is performed so as to merge the data from the multiple spatial mappings into an overall spatial mapping that includes more detailed information than any of the separate spatial mappings prior to the merging process.

The replace process 1110 refers to a technique where specific spatial mapping data from one spatial mapping is deleted and then entirely replaced by corresponding spatial mapping data from another spatial mapping, as shown by spatial mappings 1005/1010 and 1005/1015 in FIG. 10. For instance, consider a scenario where a spatial mapping describes an entire floor in a house, including the kitchen, living room, dining room, and entryway. With reference to the Easter Egg hunt scenario, it may be desirous to use a highly detailed spatial mapping of the living room. As such, some embodiments are able to delete the portion of the spatial mapping that currently (and insufficiently) describes the living room and replace it with the spatial mapping data from another spatial mapping.

As described earlier, there may also be situations in which it is desirable to perform operations using a lower quality spatial mapping (e.g., to ensure that the resulting holograms can be projected when a lower-resolution mixed-reality system is being used). In this regard, the "intentionally" include process 1115 may be performed. Here, this operation refers to a technique that is similar to the replace process 1110 but with the requirement that the new spatial mapping data being inserted into the spatial mapping is of a lower and pre-selected quality level. In determining "quality," some embodiments (as described further later) identify and analyze the resolution parameters of the spatial mapping, identify and analyze the metadata of the spatial mapping, identify and analyze how much memory space is used to store the spatial mapping (e.g., typically, the use of more memory means that the spatial mapping is more detailed as compared to spatial mappings that use relatively less memory space), identify and analyze the actual spatial mapping data of a particular spatial mapping, and/or any other technique to gauge the quality of a spatial mapping (additional details are provided in FIGS. 12-14). Accordingly, by identifying the quality levels of different spatial mappings and by establishing a set of use criteria (e.g., in a particular use setting, it may be desirable to operate with a lower quality spatial mapping), it can be determined which type or quality of spatial mapping to use.

Sometimes, situations will arise where one spatial mapping describes a particular area in a significantly different manner than another spatial mapping. For instance, consider a scenario where, at time "A," a spatial mapping of an area was obtained. Then, at time "B," another spatial mapping of the same area was obtained. Between times "A" and "B," however, the fixtures in the area may have been rearranged in some manner (e.g., a chair was moved to a new location). As such, the spatial mapping data in the first spatial mapping will be in conflict with the second spatial mapping. It will be appreciated that other types of conflicts may also arise. As such, the identify/resolve conflicts process 1120 refers to a technique that may be used in order to identify and possibly resolve conflicts that occur from discrepancies or other types of differences between two or more spatial mappings.

Figure 12:
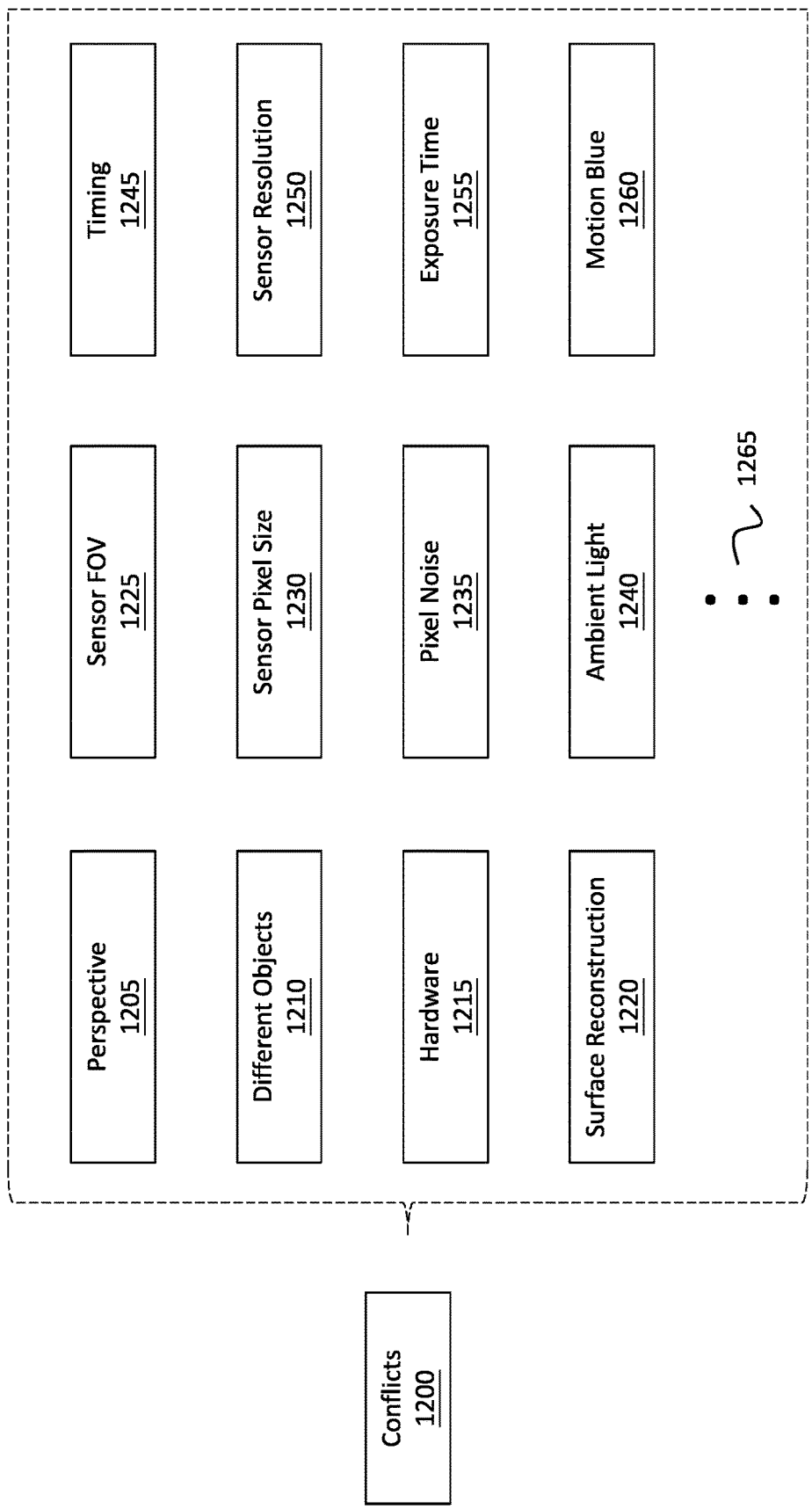
FIG. 12 illustrates that, in some instances, conflicts may arise when merging multiple spatial mappings together.

FIG. 12 shows a list of non-limiting examples of some of the types of conflicts 1200 that may occur as a result of performing operations using multiple different spatial mappings. Stated differently, differences in the attributes of overlapping portions of spatial mapping data may result in one or more potential conflicts when those overlapping portions are merged together. First, these conflicts will be introduced. After these introductions, various techniques for resolving these conflicts will be presented.

One type of conflict occurs as a result of differences in perspective 1205 with regard to where mixed-reality systems are physically located in an environment when they are used to perform their respective 3D scanning operation, thereby resulting in different levels of detail for the objects. Another conflict 1200 occurs when different spatial mappings include data describing entirely different objects 1210, such as was described earlier in the case where objects moved in the environment. Differences in hardware 1215 may also cause a conflict. Examples of hardware 1215 include 3D scanning hardware used to generate a spatial mapping, hardware logical units used to process the data in a spatial mapping (e.g., a CPU, GPU, or other type of processing unit), or rendering hardware used to project holograms that are dependent on the spatial mapping.

Another conflict may arise as a result of differences in surface reconstruction 1220 mechanisms. Surface reconstruction 1220 generally refers to the process of reconstructing an object's geometric shape (e.g., its corners, planes, curves, etc.). Because different 3D scanning operations may be used (e.g., active or passive stereo, time of flight, etc.), differences may result in the appearance of an object's geometric surfaces. Differences in a 3D sensor's field of view (FOV) 1225 may also cause conflicts. For example, one mixed-reality system may use 3D sensing cameras with a wider or narrower lens. Similarly, the sensor's pixels size (i.e. angular resolution) 1230 may also cause conflicts. In some cases, one 3D sensing technology may have more or less pixel noise (i.e. measurement noise) 1235 than another spatial mapping, thereby resulting in conflicts.

The environment's ambient light 1240 can also impact the quality or integrity of a spatial mapping. Other conflicts may occur as a result of differences in timing 1245, a sensor's resolution abilities 1250, the exposure time 1255 of the 3D sensor, or whether motion blur 1260 is present during the scanning operation. The ellipsis 1265 demonstrates that other conflicts may occur as well (e.g., differences in color, texture, color texturing, other types of texturing information, situations where a same 3D sensor configuration is used but where the associated depth compute and filtering processes are different, and even use of synthetic data (i.e. data obtained from a map or from the architect's three-dimensional working model)).

The disclosed embodiments are able to utilize any number of different resolution techniques to resolve these conflicts. Example resolution techniques include, but are not limited to camera reprojection (i.e. programmatically changing the viewpoint/perspective from which a camera captures a depth image), timestamp comparison to determine which spatial mapping is the most current (and thus probably the most accurate), selective deletion (e.g., delete motion blur, pixel noise, misalignments as a result of differences in ambient light, detecting erroneous surface reconstruction information as between the data in one spatial mapping and another spatial mapping), estimating an importance of a particular portion of spatial mapping data with respect a mixed-reality scene (e.g., a small lamp or table at the edge of the room might have a relatively low importance or role for the mixed-reality scene, thus conflicts for that small lamp or table can be resolved simply by deleting, discarding, or not considering the data for those objects), and/or selectively choosing to rely/depend on one spatial mapping (or create a new spatial mapping) as opposed to relying on another spatial mapping (e.g., the selection could be dependent on the current mixed-reality system's hardware platform or configuration). In some implementations, the resolution techniques resolve conflicts simply by using a spatial mapping with higher or better quality. In other implementations, conflicts are resolved by merging the data from multiple different spatial mappings in an attempt to obtain a more detailed spatial mapping. Accordingly a variety of different techniques may be used to resolve conflicts.

Measuring and Scoring Quality

Figure 13:
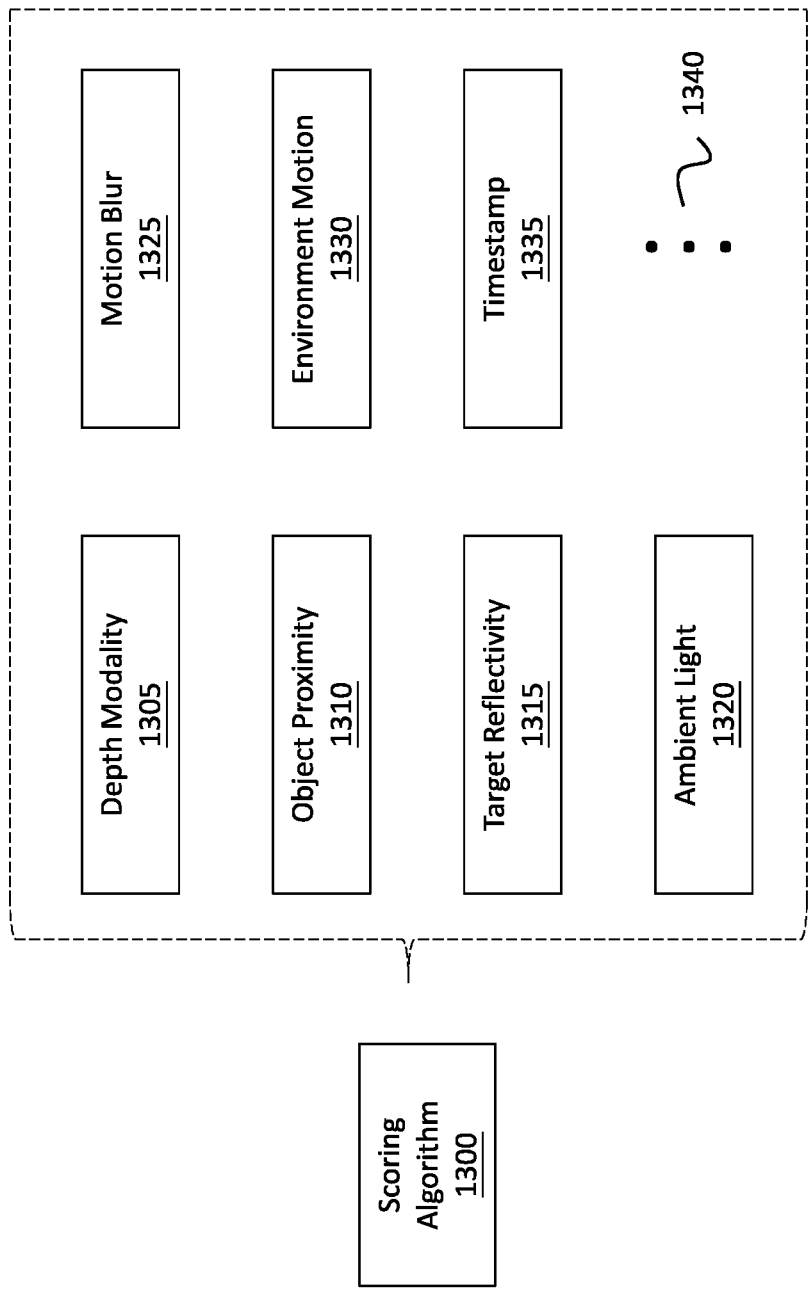
FIG. 13 illustrates a scoring algorithm for determining the quality level of a spatial mapping.
Figure 14:
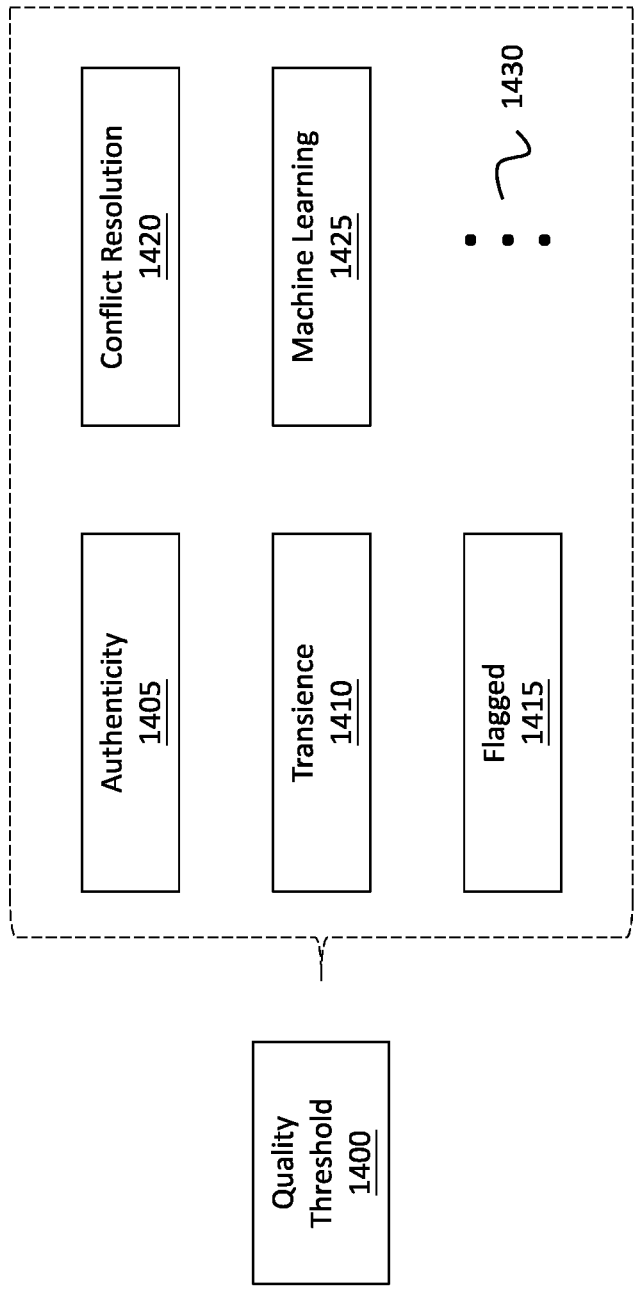
FIG. 14 illustrates different quality thresholds that may be considered when determining an overall quality metric for a spatial mapping and when determining whether to merge the data from that spatial mapping with any number of other spatial mappings.

Attention will now be directed to FIGS. 13 and 14 which generally relate to some processes that may be utilized in order to determine and score the quality levels of a spatial mapping and/or the quality levels of a contribution to a spatial mapping. In some embodiments, such as is shown in FIG. 13, a scoring algorithm 1300 is used to determine these quality levels.

In situations where a group of multiple spatial mappings can be used to augment the data in another spatial mapping, some embodiments assign a higher weight, higher priority, or higher influence to spatial mappings with higher quality as opposed to spatial mappings with lower quality. In other embodiments, the contrary is true. For instance, in some scenarios, a relatively lower quality spatial mapping is given higher priority than a relatively higher quality spatial mapping.

To determine quality, some embodiments utilize the scoring algorithm 1300. Additionally, or alternatively, the scoring algorithm 1300 can be used to grade or otherwise evaluate the quality of a contribution that was made to a spatial mapping. These contribution qualities can be stored in a database for tracking purposes. For example, if a particular user or computing system is identified as always making high quality contributions, then less scrutiny (over time) may be used when determining whether to allow the desired contribution. In contrast, if a user or computer system is identified as always making very low quality contributions, then an increased degree of scrutiny may be used when determining whether to allow the desired contribution. It will be appreciated that in some embodiments, determining a quality level can be performed by analyzing the type of input device that is used to generate spatial mapping data (e.g., by analyzing the hardware attributes). Another relevant quality indicator is the amount of input data that is used to compute the spatial mapping as a whole (e.g., the amount of data that is averaged together).

When ranking or determining the quality level of a particular spatial mapping, the scoring algorithm 1300 may consider any one or combination of the following attributes: depth modality 1305, object proximity 1310, target reflectivity 1315, ambient light 1320, motion blue 1325, environment motion 1330, and timestamp 1335. The ellipsis 1340 demonstrates that the scoring algorithm 1300 may consider other parameters as well. These factors may be used to influence the determination of a spatial mapping's quality.

Depth modality 1305 refers to the different depth processing techniques that may be used to determine an object's depth. These depth processing techniques include, but are not limited to, active or passive stereo matching (i.e. using pixel displacement information obtained from at least two cameras that capture images of the same area but from different perspective), structured light (e.g., the addition of an infrared dot or flood pattern in order to introduce texture on a smooth surface), and time of flight.

Object proximity 1310 relates to how close or proximate a particular object is to the 3D sensing system when a scanning operation is performed. Often, the closer in proximity an object is to the 3D sensing system, the better or higher quality the resulting spatial mapping data for that object will be. Consequently, a relatively straightforward and non-resource intensive technique for determining quality is by simply determining how proximate the 3D sensing system was to a particular object at the time of the scanning operation.

Target reflectivity 1315 refers to how much of the incident light is reflected back to the 3D sensor. When active 3D sensing techniques are used, objects with low reflectivity return a low number of photons to the 3D sensor, resulting in a noisy measurement. The accuracy of the 3D depth measurement may thus be compromised.

When passive stereo depth measurement systems are used, the ability to perform the correspondence search between the two cameras may be influenced by how "smooth" an object is. Smooth objects with few features (e.g., a bare wall) are sometimes difficult to accurately determine the depth range. To compensate for this difficultly, some of the disclosed embodiments add texture to the smooth object by projecting an infrared dot pattern onto the object and then by detecting the reflected infrared light from the smooth object. Such an operation enables the 3D sensing system to determine the smooth object's surface. As such, if the environment includes a relatively high number of smooth objects, then the quality of the resulting spatial mapping may be called into question. In this manner, determining the spatial mapping's quality may be influenced by the number of highly reflective objects in the environment, by the relative proportionality of the amount of space that these highly reflective objects occupy in the environment as compared to the amount of space occupied by other objects in the environment, and/or by the availability of an infrared dot pattern projector and compatible 3D sensing system.

The amount of ambient light 1320 may also impact the quality level of a spatial mapping. For instance, if a RGB 3D sensing system is used in a lower light environment, then the RGB 3D sensing system may not be able to capture a sufficient amount of light to generate a detailed representation of the environment. In some cases, however, passive stereo systems are able to accurately measure the 3D geometry of highly textured systems in the presence of high amounts of ambient light.

Alternatively, some 3D sensing systems incorporate the use of infrared flood light. By projecting a flood of infrared light, and then using an infrared 3D sensing camera, these embodiments are able to generate an environment's depth, even though they may be partially influenced by the amount of ambient light in the system, as the ambient light adds additional noise to the desired IR illumination, thus potentially reducing the accuracy of the 3D measurement. Accordingly, some embodiments factor in the amount of ambient light 1320 that was present in the environment at the time of the scanning operation.

Motion blur 1325 refers to a scenario where an object was moving at the time of the scanning operation. Similar to how "ghosting" may occur with a camera when an object moves, motion blur 1325 can also occur when generating 3D depth information. Motion blur 1325 can be detected in a number of different ways. For instance, a machine learning algorithm can be used to examine the spatial mapping data to identify ghosting or blurring. Similarly, examination of the pixel depth information can also be performed to identify blurring conditions. Motion blur 1325 negatively impacts the quality of a spatial mapping.

Environment motion 1330 refers to the general stability of the environment that is being scanned. Take, for instance, an environment that includes a large number of highly transient objects (e.g., the pendulum of a grandfather clock, a wall-mounted kinetic sculpture that continuously moves, the inside of a moving car with windows showing the outside, etc.). With such an environment, the resulting spatial mapping may include high amounts of distortion, inaccuracies, or unverifiable data. In contrast, consider an environment that includes very little motion (e.g., a basement of a house that includes very few moveable fixtures). This environment will have little or even no environment motion 1330.

Finally, a timestamp 1335 may also be used. As an example, consider a scenario where a timestamp shows that a spatial mapping for an environment was recorded many months ago. In this scenario, it seems highly likely that the spatial mapping is outdated, stale, or otherwise obsolete. In contrast, consider a timestamp showing that the spatial mapping was recorded just a few minutes ago. This spatial mapping is up-to-date and should be provided with a higher quality level than the out-of-date spatial mapping.

The disclosed embodiments are configured to augment data from any number of different spatial mappings. Determining whether to perform this augmentation process is based, at least in part, on the quality levels of those spatial mappings, including on one or more pre-selected quality thresholds 1400, as shown in FIG. 14.

A quality threshold can be established for any criteria. Some non-limiting examples of quality thresholds include, but are not limited to, an authenticity threshold 1405, a transience threshold 1410, a flagged threshold 1415, a conflict resolution threshold 1420, and a machine learning threshold 1425. The ellipsis 1430 demonstrates that other thresholds may be established as well.

Regarding the authenticity threshold 1405, this threshold refers to the level of security or authenticity that is required to merge data with a particular spatial mapping. For example, consider a national robotics laboratory that includes highly confidential/sensitive equipment. To gain entry into the laboratory, a worker is required to have a suitable security clearance. Furthermore, some rooms in the laboratory might be more secure than other rooms. In situations involving virtual space, a spatial mapping of a highly sensitive room probably should not be merged with a spatial mapping of a less sensitive room, even though those two rooms are located within the same laboratory environment. Consequently, some embodiments require some spatial mappings to satisfy a particular authenticity threshold in order to be merged with another spatial mapping. Other authenticity threshold parameters may be based on a user's or computer's security clearance in working with a spatial mapping, an authenticity tag of a spatial mapping, a certificate of a spatial mapping, a credential included within the spatial mapping, GPS coordinates associated with a spatial mapping, scene matching (e.g., does the data in one spatial mapping adequately correspond to the data in another spatial mapping), the relevance of one spatial mapping for a particular environment as compared to the relevance of another spatial mapping, or any other type of mechanism used to portray the authenticity of data.

The authenticity threshold 1405 can also be used in connection with the user's or computer's contribution quality, as described earlier. For instance, if the user/computer is determined to always provide high quality contributions, then it may be provided higher authenticity credentials, thus enabling it to easily satisfy the authenticity threshold 1405. In contrast, if the user/computer provides low quality contributions, its credentials may be progressively decreased or lowered over time, thereby preventing it from satisfying the authenticity threshold 1405.

As briefly discussed earlier, objects in a room might be identified as being highly transitory. The transience threshold 1410 can be used to establish limits on the number or amount of these types of objects that are permitted to be incorporated into a spatial mapping. If the transience threshold 1410 is surpassed, then spatial mapping data can be removed and/or prevented from being included in another spatial mapping to thereby improve quality.

The flagged threshold 1415, in some cases, refers to the amount of flagged content that is permitted in a spatial mapping while still allowing that spatial mapping to be merged with another spatial mapping. For instance, a spatial mapping may include data for any number of holograms. Some of these holograms may be appropriate for all types of users while some may be appropriate only for adults or mature users. To assist in identifying the suitability or appropriateness of a particular hologram, the hologram's metadata can be tagged or flagged to indicate the hologram's type. Users, applications, or any type of autonomous system can mark the metadata.

Some embodiments will prevent data from one spatial mapping from being included in another spatial mapping if the one includes too many flagged holograms or other type of flagged data. Stated differently, if the number of flagged material in a spatial mapping surpasses the flagged threshold 1415, then one spatial mapping may not be permitted to augment another spatial mapping. Alternatively, if data in a particular set of spatial mapping data has been flagged, then some embodiments remove and/or prevent only the flagged spatial mapping data from being included in another set of spatial mapping data while allowing remaining data to be merged.

On a similar token, if conflict resolution processing is to be performed to merge multiple spatial mappings, then some embodiments estimate the levels or amount conflict resolution processing that would be required in order to successfully merge the multiple spatial mappings together. If this level exceeds a defined conflict resolution threshold 1420, then it may be determined that the relative computing cost (e.g., battery drain, CPU usage, data usage, etc.) outweighs the relative benefit of merging these spatial mappings, and that operation can be cancelled and/or another (more compatible) spatial mapping can be used.

In some embodiments, a machine learning algorithm is used to check against a database of other content. The machine learning algorithm is able to compare and contrast the content in one spatial mapping against the content in the database to determine whether it is worthwhile to merge that spatial mapping with another spatial mapping. For instance, the database might be a database that stores marked content, where the markings indicate that the content has been flagged as a result of it being obscene or undesirable in some manner. Alternatively, the database might be a database that stores many other spatial mappings, and the machine learning algorithm is able to query the database to find other spatial mappings that correlate to the current spatial mappings (e.g., they represent the same area or environment). In this regard, the database is useful to identify other spatial mappings that can help augment the current spatial mapping. Because machine learning processing can be resource intensive (e.g., battery, CPU usage, etc.), a machine learning threshold 1425 can be established to determine an acceptable level of this processing to ensure that the benefits of performing machine learning operations outweigh the costs of performing machine learning operations. Additionally, or alternatively, after comparing spatial mapping data to the database of flagged data, a process of selectively removing particular data (from the spatial mapping data) corresponding to the flagged data can be performed.

Accordingly, any number of thresholds may be established to control when spatial mapping data is permitted to augment other spatial mapping data. When multiple users contribute or offer spatial mapping data to a virtual space, it is desirable to protect the integrity of that virtual space (e.g., geometry and view). The thresholds described above help ensure high quality levels are maintained to provide users with better mixed-reality experiences. Accordingly, quality thresholds can be established to ensure that spatial mapping data satisfies certain quality assurances prior to that data being merged with other spatial mapping data.

Additional Techniques to Protect the Integrity of a Spatial Mapping

Figure 15A:
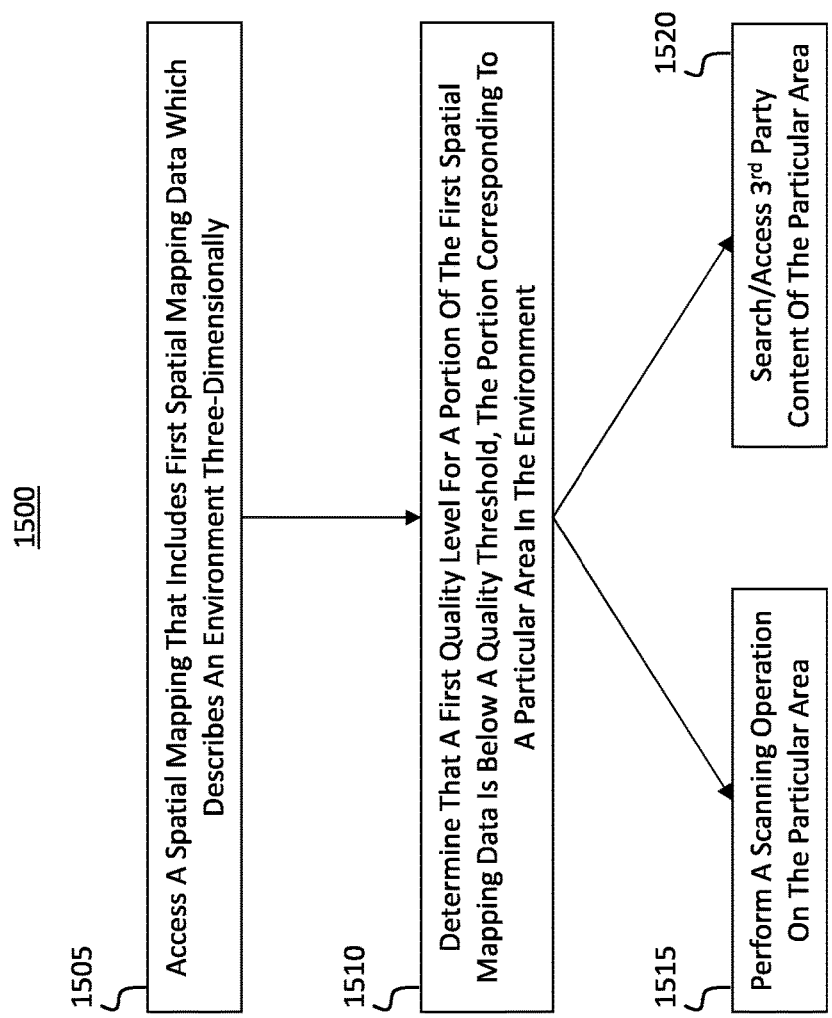
FIGS. 15A and 15B illustrate a flowchart of an example method for merging together the data from multiple different spatial mappings.
Figure 15B:
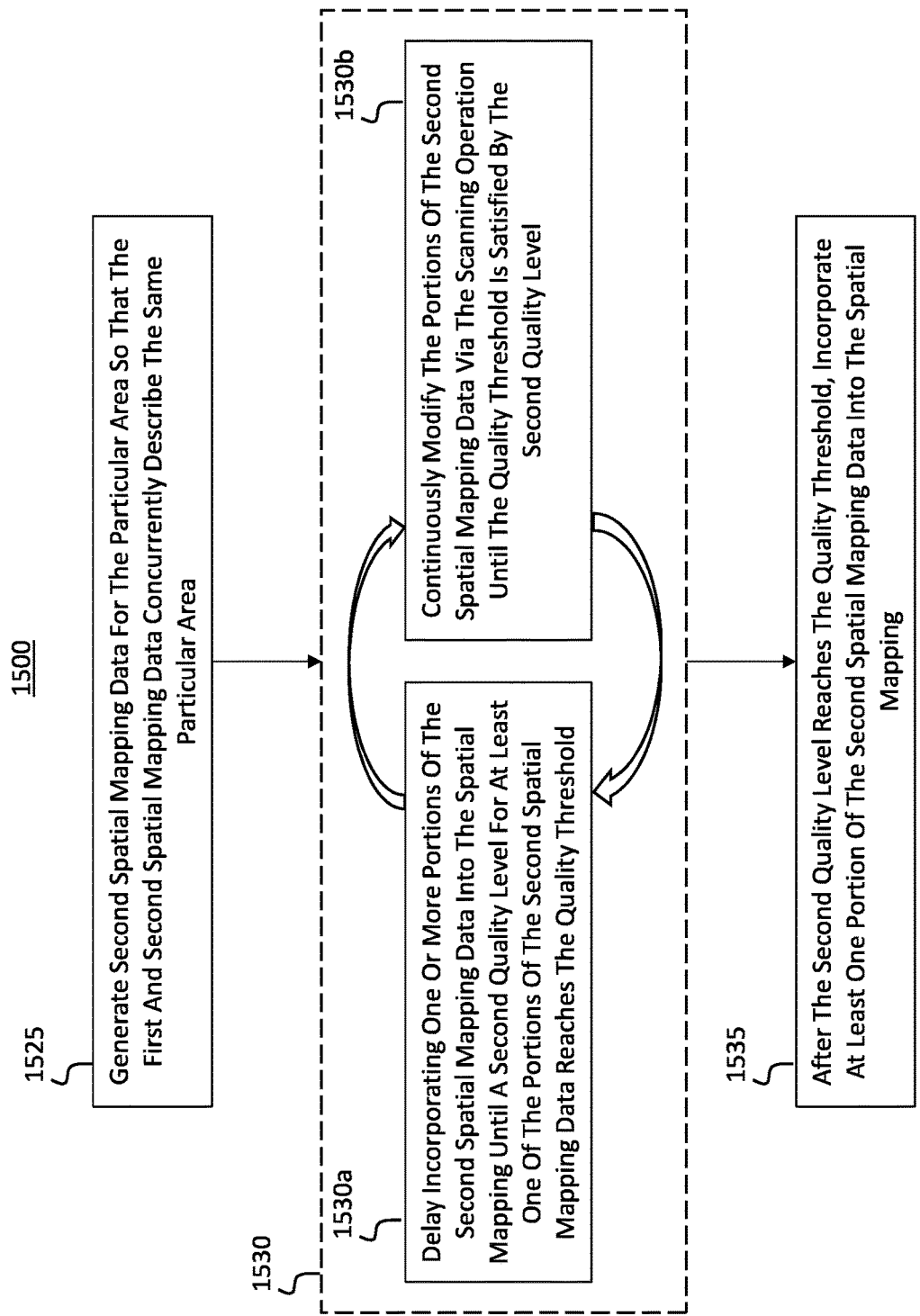

FIGS. 15A and 15B illustrate a flowchart of an example method 1500 for merging surface reconstruction data to generate an overall spatial mapping of an environment. Initially, method 1500 includes an act (act 1505) of accessing a spatial mapping of an environment, where the spatial mapping includes first spatial mapping data that describes the environment three-dimensionally. This spatial mapping may be representative of any of the spatial mappings discussed thus far.

A determination is then made that a first quality level for a portion of the first spatial mapping data is below a quality threshold (act 1510). Here, the portion of the first spatial mapping data may correspond to a particular area in the environment, such as the areas corresponding to spatial mappings 1010, 1015, 1020, and 1025 in FIG. 10.

After making the above determination, a number of alternative processes may be performed (e.g., by the computer system implementing the method 1500). In a first process, a scanning operation is performed on the particular area in the environment (act 1515). In a second process, previously stored third-party content, which describes the particular area, may be accessed.

Regardless of which of these two alternative operations is performed, the end result is that second spatial mapping data is generated for that particular area (act 1525). In this regard, the second spatial mapping data and the first spatial mapping data concurrently describe at least the same particular area in the environment. With reference to FIG. 10, a portion of spatial mapping 1005 and spatial mapping 1025 both describe the same area in environment 1000.

Additionally, there is an act (act 1530) of progressively modifying the data in the second spatial mapping. To do so, two complementary acts (acts 1530*a* and 1530*b*) are performed, as shown in FIG. 15B. These two acts may be repeatedly performed until such time as a particular condition is satisfied.

For instance, in act 1530*a*, the second spatial mapping data is purposefully delayed from being incorporated into the spatial mapping until a second quality level for the second spatial mapping data reaches the quality threshold. To achieve the quality requirement, the second spatial mapping data is continuously modified via the scanning operation until the quality threshold is satisfied (act 1530*b*). Stated differently, the second spatial mapping data is continuously modified (e.g., by adding data generated from the scanning operation, or, alternatively, by removing data) until such time as its quality reaches a desired level.

After the second quality level for the second spatial mapping data reaches the quality threshold, the second spatial mapping data is incorporated into the spatial mapping (act 1535). Accordingly, FIGS. 15A and 15B illustrate an example method for systematically modifying the quality of spatial mapping data to ensure that the quality satisfies one or more pre-established conditions or requirements.

Figure 16:
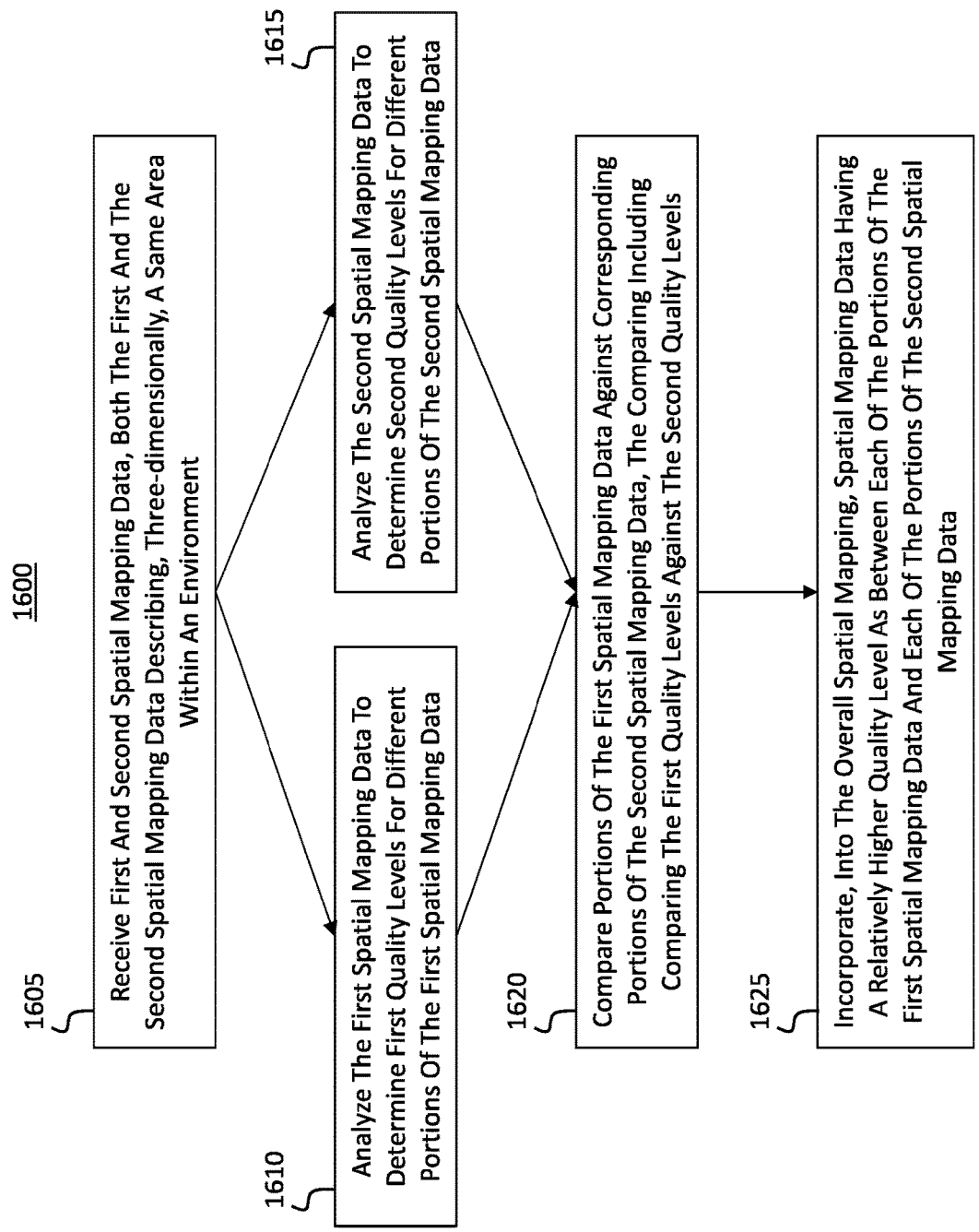
FIG. 16 illustrates another flowchart of an example method for comparing and contrasting the quality levels of different spatial mappings and for incorporating, into an overall spatial mapping, the spatial mapping data for those spatial mappings that have relatively higher or better quality.

FIG. 16 shows a flowchart of another example method 1600 for stitching/merging/fusing multiple different portions of spatial mapping data together to form an overall spatial mapping. In some embodiments, method 1600 is performed by at least one computer system in a cloud computing environment.

Initially, first and second spatial mapping data are received (act 1605). In this case, both the first and second spatial mapping data describe, three-dimensionally, the same area within an environment (e.g., spatial mappings 1005 and 1020 or spatial mappings 1005 and 1025 from FIG. 10).

The first spatial mapping data is then analyzed to determine first quality levels for different portions of the first spatial mapping data (act 1610). Either in parallel or in serial with act 1610, the second spatial mapping data is analyzed to determine second quality levels for different portions of the second spatial mapping data (act 1615). With reference to FIG. 10, the quality of the portion of spatial mapping 1005 that overlaps spatial mapping 1025 can be analyzed and the quality of the entirety (or a portion) of spatial mapping 1025 can be analyzed. These two overlapping portions both describe the same area, and so it is beneficial to determine their respective quality levels to determine whether to merge their data (this step is performed, of course, prior to them actually being merged).

Portions of the first spatial mapping data are then compared against corresponding portions of the second spatial mapping data (act 1620). This comparison operation includes comparing the first quality levels against the second quality levels, as shown in FIG. 8. Thereafter, there is an act (act 1625) of incorporating, into the overall spatial mapping, spatial mapping data having a relatively higher quality level (or perhaps a lower quality level) as between each of the portions of the first spatial mapping data and each of the portions of the second spatial mapping data. In some instances, the process is performed only if the relatively higher (or lower) quality level also satisfies a pre-determined quality threshold. By so doing, at least some of the portions of the first spatial mapping data are merged together (in the overall spatial mapping) with at least some of the portions of the second spatial mapping data. Accordingly, the method described in FIG. 16 enables embodiments that are able to merge different portions of data from different spatial mappings.

Example Computer System

Figure 17:
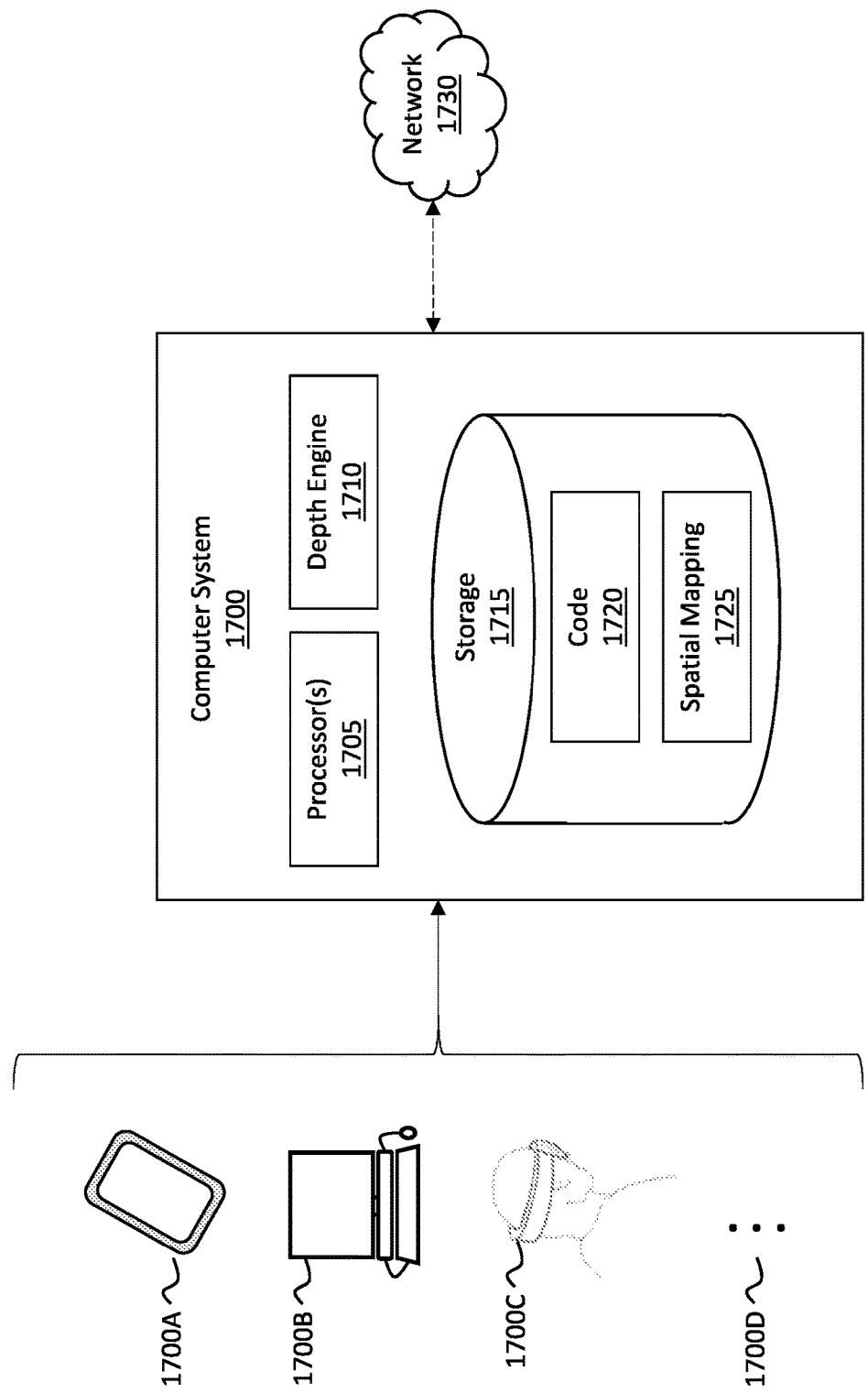
FIG. 17 illustrates an example computer system capable of performing any of the disclosed operations.

Attention will now be directed to FIG. 17 which illustrates an example computer system 1700 that may be used to facilitate the operations described herein. In particular, this computer system 1700 may be in the form of the HMDs that were described earlier.

In fact, computer system 1700 may take various different forms. For example, in FIG. 17, computer system 1700 may be embodied as a tablet 1700A, a desktop 1700B, or a HMD 1700C. The ellipsis 1700D demonstrates that computer system 1700 may be embodied in any form. For example, computer system 1700 may also be a distributed system that includes one or more connected computing components/devices that are in communication with computer system 1700, a laptop computer, a mobile phone, a server, a data center, and/or any other computer system. The ellipsis 1700D also indicates that other system subcomponents may be included or attached with the computer system 1700, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments.

In its most basic configuration, computer system 1700 includes various different components. For example, FIG. 17 shows that computer system 1700 includes at least one processor 1705 (aka a "hardware processing unit"), a depth engine 1710, and storage 1715.

Depth engine 1710 may include any type of 3D sensing hardware to scan and generate a spatial mapping of an environment. For instance, depth engine 1710 may include any number of time of flight cameras, stereoscopic cameras, and/or depth cameras. Using these cameras, the depth engine 1710 is able to capture images of an environment and generate a 3D representation of that environment. Accordingly, depth engine 1710 includes any hardware and/or software components necessary to generate a spatial mapping (which may include depth maps, 3D dot/point clouds, and/or 3D meshes).

Storage 1715 is shown as including executable code/instructions 1720 and a spatial mapping 1725 (such as any of the spatial mappings discussed herein). Storage 1715 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well. As used herein, the term "executable module," "executable component," or even "component" can refer to software objects, routines, or methods that may be executed on computer system 1700. The different components, modules, engines, and services described herein may be implemented as objects or processors that execute on computer system 1700 (e.g. as separate threads).

The disclosed embodiments may comprise or utilize a special-purpose or general-purpose computer including computer hardware, such as, for example, one or more processors (such as processor 1705) and system memory (such as storage 1715), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras, accelerometers, gyroscopes, acoustic sensors, magnetometers, etc.). Further, computer system 1700 may also be connected through one or more wired or wireless networks 1730 to remote systems(s) that are configured to perform any of the processing described with regard to computer system 1700.

During use, a user of computer system 1700 is able to perceive information (e.g., a mixed-reality environment) through a display screen that is included among any I/O interface(s) of computer system 1700 and that is visible to the user. The I/O interface(s) and sensors also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

A graphics rendering engine may also be configured, with processor 1705, to render one or more virtual objects within a mixed-reality scene/environment. As a result, the virtual objects accurately move in response to a movement of the user and/or in response to user input as the user interacts within the virtual scene.

A "network," like the network 1730 shown in FIG. 17, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1730. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1705). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to:
   access a stored spatial mapping of an environment, wherein the spatial mapping includes first spatial mapping data that describes the environment three-dimensionally, and wherein the spatial mapping includes coloring and/or texturing information;
   access second spatial mapping data that describes at least a particular range of the environment three-dimensionally, wherein the first spatial mapping data and the second spatial mapping data each include an overlapping portion that concurrently describes the particular range of the environment, and wherein an overlapping portion of the second spatial mapping data is captured at a different time than an overlapping portion of the first spatial mapping data;
   perform a comparison between a first quality level of the overlapping portion of the first spatial mapping data against a second quality level of the overlapping portion of the second spatial mapping data, wherein at least one of the first quality level or the second quality level is based on a determined motion blur condition, a determined amount of motion in the environment, or a determined amount of motion of the computer system; and
   augment the overlapping portion of the first spatial mapping data in the stored spatial mapping of the environment with the overlapping portion of the second spatial mapping data in response to determining that the second quality level is greater than the first quality level, or, alternatively, refrain from augmenting the overlapping portion of the first spatial mapping data in the stored spatial mapping of the environment with the overlapping portion of the second spatial mapping data in response to determining that the second quality level fails to exceed the first quality level.

2. The computer system of claim 1, wherein augmenting the overlapping portion of the first spatial mapping data in the stored spatial mapping of the environment with the overlapping portion of the second spatial mapping data includes replacing the overlapping portion of the first spatial mapping data with the overlapping portion of the second spatial mapping data in the stored spatial mapping.

3. The computer system of claim 1, wherein augmenting the overlapping portion of the first spatial mapping data in the stored spatial mapping of the environment with the overlapping portion of the second spatial mapping data includes supplementing at least some portions of the overlapping portion of the first spatial mapping data with at least some portions of the overlapping portion of the second spatial mapping data in the stored spatial mapping.

4. The computer system of claim 1, wherein the overlapping portion of the second spatial mapping data includes conflicting data with the overlapping portion of the first spatial mapping data, the conflicting data corresponding to a physical object located in the particular range of the environment, the conflicting data occurring as a result of the overlapping portion of the second spatial mapping data describing the physical object but the overlapping portion of the first spatial mapping data not describing the physical object.

5. The computer system of claim 1, wherein the first spatial mapping data was generated by a first three-dimensional (3D) sensing system that generates 3D data for the first spatial mapping and the second spatial mapping data was generated by a second 3D sensing system, the first 3D sensing system being different than the second 3D sensing system.

6. The computer system of claim 1, wherein the overlapping portion of the second spatial mapping data is captured from a different physical perspective from within the environment as compared to how the overlapping portion of the first spatial mapping data is captured.

7. The computer system of claim 1, wherein the overlapping portion of the second spatial mapping data is captured using a different type of surface reconstruction mechanism or hardware type than how the overlapping portion of the first spatial mapping data is captured.

8. The computer system of claim 1, wherein the overlapping portion of the first spatial mapping data includes different attributes than the overlapping portion of the second spatial mapping data, the different attributes including at least one of: a sensor resolution difference, a sensor field of view difference, a sensor pixel size difference, a pixel noise characteristic difference, an ambient light difference, an exposure time difference, or a motion blur difference.

9. The computer system of claim 1, wherein the spatial mapping includes object labeling, the object labelling including classifiers to identify objects within the environment.

10. A system for merging surface reconstruction data to generate an overall spatial mapping of an environment, the system comprising:
one or more processors; and
one or more computer-readable hardware storage devices storing computer-executable instructions that are executable by the one or more processors to configure the computer system to perform at least the following:
access a spatial mapping of an environment, wherein the spatial mapping includes first spatial mapping data that describes the environment three-dimensionally;
determine that a first quality level for a portion of the first spatial mapping data is below a quality threshold, the portion of the first spatial mapping data corresponding to a particular area in the environment;
in response to determining that the first quality level for the portion of the first spatial mapping data is below a quality threshold, cause the computer system to perform a scanning operation on the particular area in the environment to generate second spatial mapping data for the particular area that comprises a three-dimensional representation of the particular area;
determine a second quality level for one or more portions of the three-dimensional representation of the particular area of the second spatial mapping data; and
in response to determining that the second quality level for the one or more portions of the three-dimensional representation of the particular area of the second spatial mapping fails to satisfy the quality threshold:
delay incorporating the one or more portions of the three-dimensional representation of the particular area of the second spatial mapping data into the spatial mapping;
perform an updated scanning operation of the particular area in the environment; and
generate updated second spatial mapping data based on the updated scanning operation of the particular area in the environment that comprises an updated three-dimensional representation of the particular area; and
determine an updated second quality level for one or more portions of the updated three-dimensional representation of the particular area of the updated second spatial mapping; and
in response to determining that the second quality level or the updated second quality level satisfies the quality threshold, incorporate the one or more portions of the three-dimensional representation of the particular area of the second spatial mapping data or the one or more portions of the updated three-dimensional representation of the particular area of the second spatial mapping data into the spatial mapping.

11. The system of claim 10, wherein the spatial mapping of the environment includes segmentation information for objects located within the environment such that the segmentation information identifies the objects.

12. The system of claim 10, wherein the quality threshold includes a verification of authenticity for the second spatial mapping data.

13. The system of claim 10, wherein the environment includes one or more objects that are identified as being transient and whose transience attributes surpass a transience threshold, and wherein the second quality level for the second spatial mapping data reaching the quality threshold includes removing and/or preventing particular spatial mapping data corresponding to the one or more objects from being included in the second spatial mapping data.

14. The system of claim 10, wherein the second quality level of the second spatial mapping data reaching the quality threshold includes:
determining whether any data in the second spatial mapping data has been flagged; and
removing and/or preventing flagged spatial mapping data from being included in the second spatial mapping data.

15. The system of claim 10, wherein the second quality level of the second spatial mapping data reaching the quality threshold includes:
causing a machine learning algorithm to compare data included in the second spatial mapping data to a database of flagged data; and
removing, from the second spatial mapping data, particular data corresponding to the flagged data included in the database.

16. The system of claim 10, wherein the second quality level of the second spatial mapping data reaching the quality threshold includes performing a conflict resolution when erroneous surface reconstruction information as between the second spatial mapping data and the first spatial mapping data is identified.

17. In a cloud computing environment, a method for fusing multiple different spatial mapping data together to form an overall spatial mapping, the method being performed by at least one computer system in the cloud computing environment and comprising:
receiving first spatial mapping data and second spatial mapping data, both the first spatial mapping data and the second spatial mapping data describing, three-dimensionally, a same area within an environment, the first spatial mapping data and the second spatial mapping data being captured at different times;
analyzing the first spatial mapping data to determine first quality levels for different portions of the first spatial mapping data;
analyzing the second spatial mapping data to determine second quality levels for different portions of the second spatial mapping data;
comparing portions of the first spatial mapping data against corresponding portions of the second spatial mapping data, the comparing including comparing at least some of the first quality levels against at least some of the second quality levels, wherein at least one of the first quality levels or the second quality levels are based on a determined motion blur condition, or a determined amount of motion in the environment; and
incorporating, into the overall spatial mapping, spatial mapping data having a relatively higher quality level as between each of at least some of the portions of the first spatial mapping data and each of at least some of the portions of the second spatial mapping data such that at least some of the portions of the first spatial mapping data are merged together in the overall spatial mapping with at least some of the portions of the second spatial mapping data.

18. The method of claim 17, wherein incorporating, into the overall spatial mapping, the spatial mapping data having the relatively higher quality level is performed only if the relatively higher quality level also satisfies a pre-determined quality threshold.

* * * * *